United States Patent
Kim et al.

(10) Patent No.: US 10,708,015 B2
(45) Date of Patent: Jul. 7, 2020

(54) SIGNAL TRANSMITTING METHOD FOR DEVICE-TO-DEVICE (D2D) COMMUNICATION IN WIRELESS COMMUNICATION SYSTEM AND DEVICE THEREFOR

(71) Applicant: LG ELECTRONICS INC., Seoul (KR)

(72) Inventors: Youngtae Kim, Seoul (KR); Hanbyul Seo, Seoul (KR); Kijun Kim, Seoul (KR); Inkwon Seo, Seoul (KR); Hyukjin Chae, Seoul (KR); Suckchel Yang, Seoul (KR); Myoungseob Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/112,649

(22) PCT Filed: Feb. 10, 2015

(86) PCT No.: PCT/KR2015/001326
§ 371 (c)(1),
(2) Date: Jul. 19, 2016

(87) PCT Pub. No.: WO2015/119478
PCT Pub. Date: Aug. 13, 2015

(65) Prior Publication Data
US 2016/0337103 A1 Nov. 17, 2016

Related U.S. Application Data

(60) Provisional application No. 61/937,639, filed on Feb. 10, 2014, provisional application No. 61/944,054, (Continued)

(51) Int. Cl.
*H04W 72/12* (2009.01)
*H04W 72/04* (2009.01)
(Continued)

(52) U.S. Cl.
CPC .......... *H04L 5/0048* (2013.01); *H04L 5/0091* (2013.01); *H04W 72/0446* (2013.01);
(Continued)

(58) Field of Classification Search
None
See application file for complete search history.

(56) References Cited

U.S. PATENT DOCUMENTS

2008/0189360 A1   8/2008   Kiley et al.
2008/0285529 A1   11/2008   Kwak et al.
(Continued)

FOREIGN PATENT DOCUMENTS

CN   1527623 A   9/2004
WO   2013/133576 A1   9/2013
(Continued)

OTHER PUBLICATIONS

U.S. Appl. No. 61/974,514—Sorrentino; Stefano; filed Apr. 3, 2014 (Year: 2014).*
(Continued)

*Primary Examiner* — Brandon M Renner
*Assistant Examiner* — The Hy Nguyen
(74) *Attorney, Agent, or Firm* — Park, Kim & Suh, LLC

(57) ABSTRACT

The present invention relates to a method and a device for transmitting a device-to-device (D2D) signal of a first terminal in a wireless communication system. Particularly, the method comprises the steps of: receiving at least one parameter for D2D communication which includes a scheduling assignment identity (ID); and transmitting a D2D signal generated by using the scheduling assignment ID to a second
(Continued)

terminal through an uplink subframe, wherein the scheduling assignment ID is associated with the second terminal for the D2D communication.

6 Claims, 8 Drawing Sheets

Related U.S. Application Data filed on Feb. 24, 2014, provisional application No. 62/001,592, filed on May 21, 2014, provisional application No. 62/002,186, filed on May 23, 2014, provisional application No. 62/017,824, filed on Jun. 26, 2014, provisional application No. 62/034,748, filed on Aug. 7, 2014.

(51) Int. Cl.
*H04W 88/02* (2009.01)
*H04L 5/00* (2006.01)

(52) U.S. Cl.
CPC ... *H04W 72/1278* (2013.01); *H04W 72/1284* (2013.01); *H04W 88/02* (2013.01)

(56) References Cited

U.S. PATENT DOCUMENTS

| | | |
|---|---|---|
| 2011/0077038 A1 | 3/2011 | Montojo et al. |
| 2013/0039332 A1* | 2/2013 | Nazar ............... H04B 7/0452 370/330 |
| 2013/0329543 A1* | 12/2013 | Ogawa ............... H04J 13/18 370/209 |
| 2013/0343334 A1* | 12/2013 | Papasakellariou ............ H04W 72/0413 370/329 |
| 2014/0003262 A1 | 1/2014 | He et al. |
| 2014/0045508 A1* | 2/2014 | Bontu ............... H04L 5/006 455/450 |
| 2014/0370904 A1* | 12/2014 | Smith ............... H04W 8/005 455/450 |
| 2015/0003263 A1* | 1/2015 | Senarath ............ H04L 5/0007 370/252 |
| 2015/0049694 A1 | 2/2015 | Choi et al. |
| 2015/0063272 A1* | 3/2015 | Suzuki ............... H04L 5/0051 370/329 |
| 2015/0078279 A1* | 3/2015 | Ko .................. H04L 1/1861 370/329 |
| 2015/0110038 A1 | 4/2015 | Yang et al. |
| 2017/0105209 A1* | 4/2017 | Sorrentino ........ H04W 72/1289 |
| 2017/0244501 A1* | 8/2017 | Yasukawa ............ H04B 17/27 |
| 2017/0245262 A1* | 8/2017 | Nayeb Nazar ...... H04B 1/7097 |

FOREIGN PATENT DOCUMENTS

| | | |
|---|---|---|
| WO | 2013/162333 A1 | 10/2013 |
| WO | 2013/181515 A2 | 12/2013 |
| WO | 2013/191518 A1 | 12/2013 |

OTHER PUBLICATIONS

LG Electronics: "Discussion on Resource Allocation in D2D Communications", R1-135481, 3GPP TSG RAN WG1 Meeting #75, San Francisco, USA, Nov. 11-15, 2013.

LG Electronics: "Discussion on D2D Communication Scheduling Method", R1-135483, 3GPP TSG RAN WG1 Meeting #75, San Francisco, USA, Nov. 11-15, 2013.

LG Electronics: "Issues on D2D Signal Transmissions and Receptions across Carriers", R1-135489, 3GPP TSG RAN WG1 Meeting #75, San Francisco, USA, Nov. 11-15, 2013.

Panasonic, Control signalling/channel design in D2D communication, 3GPP TSG-RAN WG1 #76b, R1-141217, 3GPP, Mar. 21, 2014, 4pages.

Intel Corporation, On D2D Discovery Preamble and Reference Signals, 3GPP TSG-RAN WG1#76b, R1-141159, 3GPP, Mar. 22, 2014, 7pages.

\* cited by examiner

--Prior Art--

(A) CONTROL-PLANE PROTOCOL STACK (B) USER-PLANE PROTOCOL STACK

SIGNAL TRANSMITTING METHOD FOR DEVICE-TO-DEVICE (D2D) COMMUNICATION IN WIRELESS COMMUNICATION SYSTEM AND DEVICE THEREFOR

This application is a National Stage Application of International Application No. PCT/KR2015/001326, filed on Feb. 10, 2015, which claims the benefit of U.S. Provisional Application No. 61/937,639, filed on Feb. 10, 2014, U.S. Provisional Application No. 61/944,054, filed on Feb. 24, 2014, U.S. Provisional Application No. 62/001,592, filed on May 21, 2014, U.S. Provisional Application No. 62/002,186, filed on May 23, 2014, U.S. Provisional Application No. 62/017,824, filed on Jun. 26, 2014 and U.S. Provisional Application No. 62/034,748, filed on Aug. 7, 2014, all of which are hereby incorporated by reference in their entirety for all purposes as if fully set forth herein.

TECHNICAL FIELD

The present invention relates to a wireless communication system, and more particularly, to a method and apparatus for transmitting a signal for device-to-device (D2D) communication.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

In order to assist an eNB and efficiently managing a wireless communication system, a UE periodically and/or aperiodically reports state information about a current channel to the eNB. The reported channel state information may include results calculated in consideration of various situations, and accordingly a more efficient reporting method is needed.

DISCLOSURE

Technical Problem

An object of the present invention devised to solve the problem lies in a method and apparatus for transmitting a signal for device-to-device (D2D) communication in a wireless communication system.

It is to be understood that both the foregoing general description and the following detailed description of the present invention are exemplary and explanatory and are intended to provide further explanation of the invention as claimed.

Technical Solution

The object of the present invention can be achieved by providing a method of transmitting a device-to-device (D2D) signal of a first user equipment (UE) in a wireless communication system, the method including receiving at least one parameter for D2D communication, including scheduling assignment identity (ID), and transmitting a D2D signal generated using the scheduling assignment ID to a second UE through an uplink subframe, wherein the scheduling assignment ID is related to the second UE for the D2D communication.

The D2D signal may be scrambled using a scrambling sequence generated based on the scheduling assignment ID, a codeword index, and a cell ID. The D2D signal may be configured with a data channel configured for the D2D communication. The codeword index may be set to 0. The cell ID may be 510.

The D2D signal may include a demodulation reference signal (DM-RS) and an orthogonal cover code (OCC) of the DM-RS may be preconfigured.

The D2D signal may include a demodulation reference signal (DM-RS) and cyclic shift and an orthogonal cover code (OCC) of the DM-RS may be defined based on the scheduling assignment ID. The OCC may be defined using a specific bit among a plurality of bits constituting the scheduling assignment ID, and the cyclic shift may be defined using remaining bits except for the specific bit among the plurality of bits. The specific bit may be an uppermost bit among the plurality of bits. The specific bit may be a bit with a minimum index among the plurality of bits.

In another aspect of the present invention, provided herein is a first user equipment (UE) for transmitting a device-to-device (D2D) signal in a wireless communication system, the first UE including a radio frequency (RF) unit, and a processor, wherein the processor is configured to receive at least one parameter for D2D communication, including scheduling assignment identity (ID) and to transmit a D2D signal generated using the scheduling assignment ID to a second UE through an uplink subframe, and the scheduling assignment ID is related to the second UE for the D2D communication.

Advantageous Effects

According to an embodiment of the present invention, a signal for device-to-device (D2D) communication can be effectively transmitted in a wireless communication system.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

In the drawings.

BEST MODE

The configuration, operation and other features of the present invention will be understood by the embodiments of the present invention described with reference to the accompanying drawings. The following embodiments are examples of applying the technical features of the present invention to a 3rd Generation Partnership Project (3GPP) system.

Although the embodiments of the present invention are described using the LTE system and the LTE-A system in the present specification, the embodiments of the present invention are applicable to any communication system corresponding to the above definition. In addition, although the embodiments of the present invention are described based on a Frequency Division Duplex (FDD) scheme in the present specification, the embodiments of the present invention may be easily modified and applied to a Half-Duplex FDD (H-FDD) scheme or a Time Division Duplex (TDD) scheme.

Figure 1:
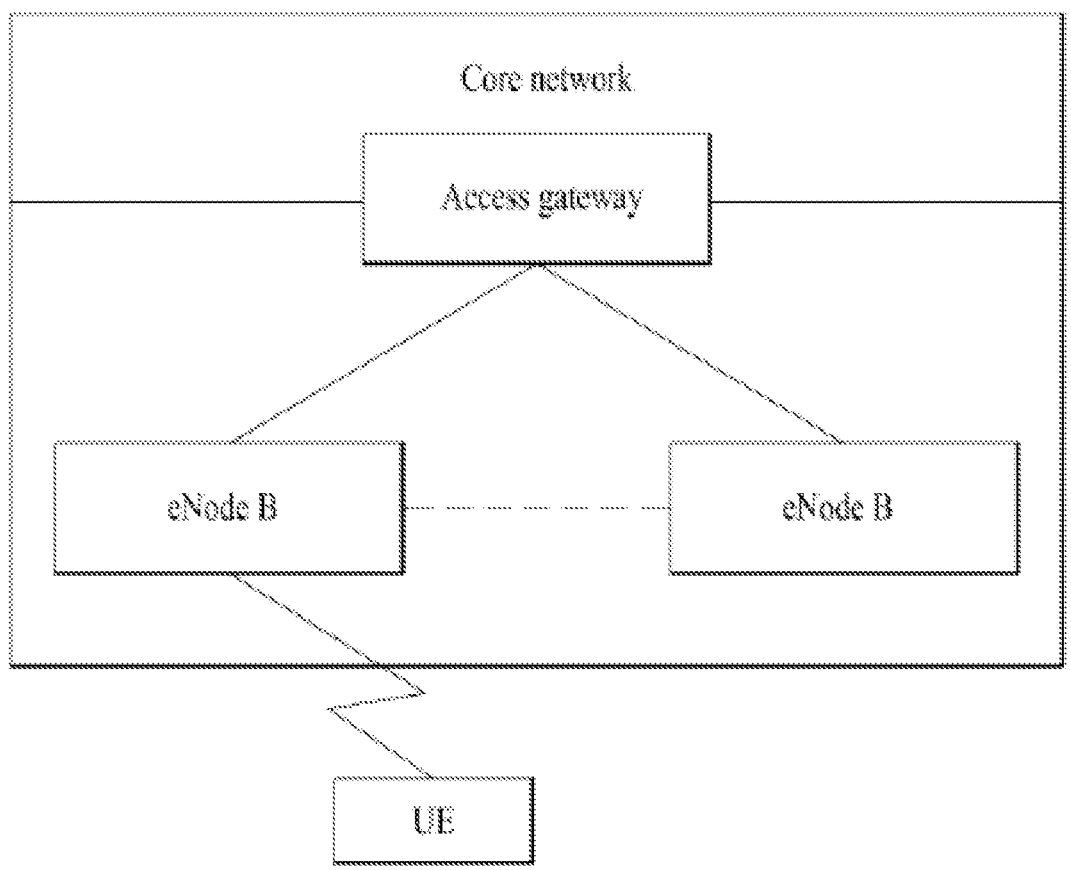
FIG. 1 is a diagram illustrating a network structure of an Evolved Universal Mobile Telecommunications System (E-UMTS) which is an example of a wireless communication system.
Figure 2:
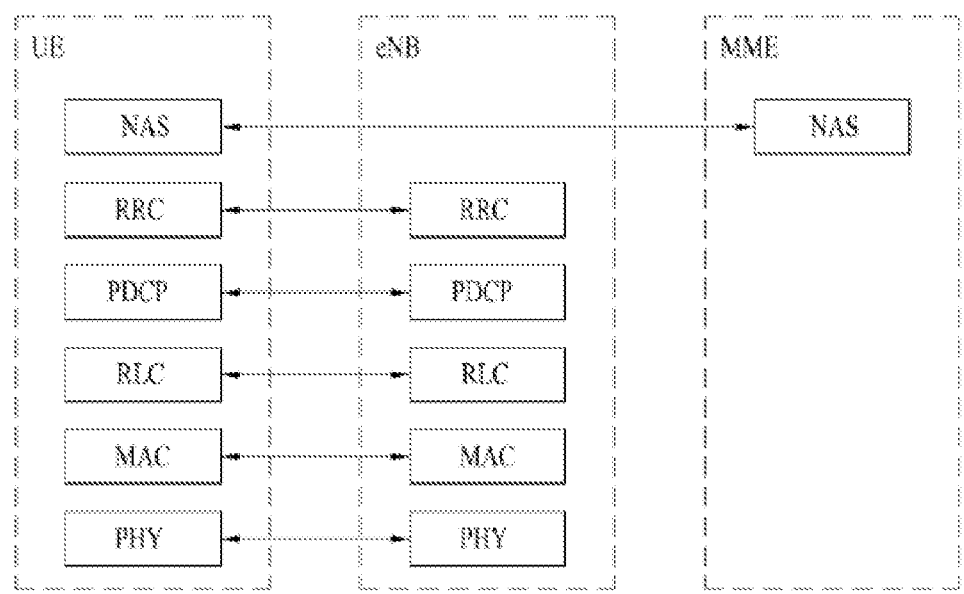
FIG. 2 is a diagram illustrating structures of a control plane and a user plane of a radio interface protocol between a user equipment and E-UTRAN based on the 3GPP radio access network standard.
Figure 2:
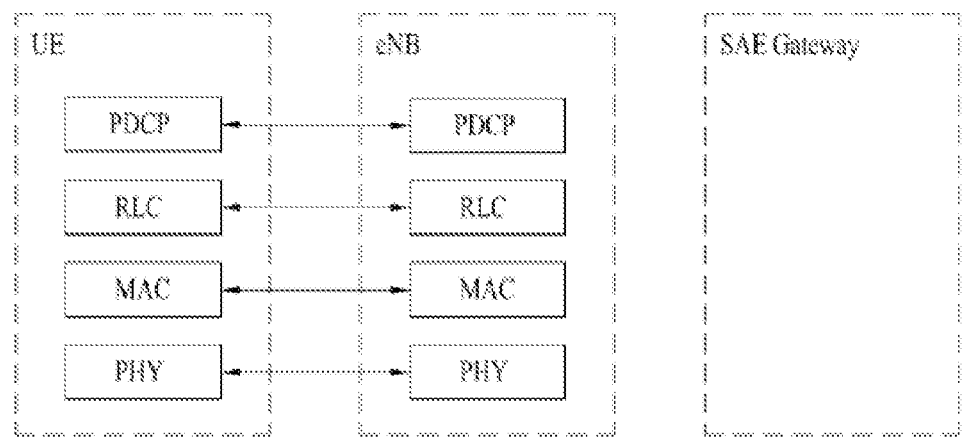

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel. The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel. The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.25, 2.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
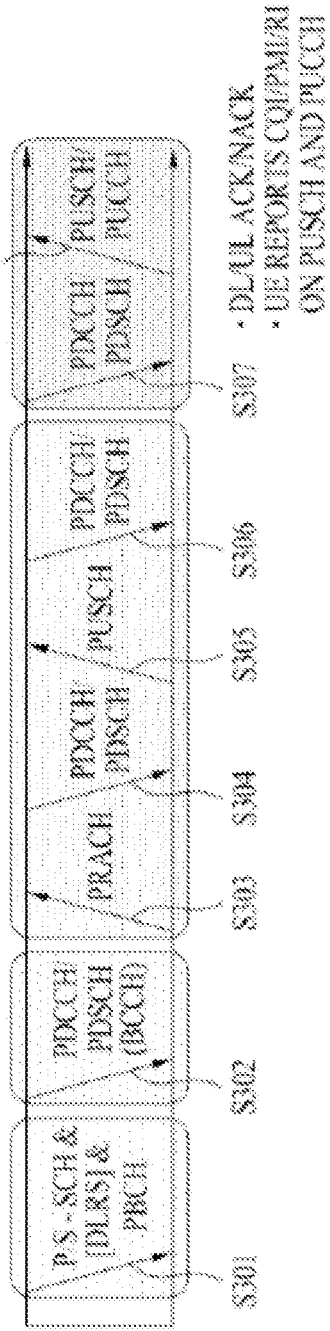
FIG. 3 is a diagram showing physical channels used in a 3GPP system and a general signal transmission method using the same.

FIG. 3 is a diagram showing physical channels used in a 3GPP system and a general signal transmission method using the same.

A UE performs an initial cell search operation such as synchronization with an eNB when power is turned on or the UE enters a new cell (S301). To this end, the UE may receive a Primary Synchronization Channel (P-SCH) and a Secondary Synchronization Channel (S-SCH) from the eNB, perform synchronization with the eNB, and acquire information such as a cell ID. Thereafter, the UE may receive a physical broadcast channel from the eNB so as to acquire broadcast information within the cell. The UE may receive a Downlink Reference Signal (DL RS) so as to check a downlink channel state in the initial cell search operation.

The UE which completes the initial cell search may receive a Physical Downlink Control Channel (PDCCH) and a Physical Downlink Shared Channel (PDSCH) according to information included in the PDCCH so as to acquire more detailed system information (S302).

When the UE initially access the eNB or there is no radio resource, the UE may perform a Random Access Procedure (RACH) on the eNB (S303 to S306). To this end, the UE may transmit a specific sequence as a preamble through a Physical Random Access Channel (PRACH) (S303 and S305) and receive a response message of the preamble through the PDCCH and the PDSCH corresponding thereto (S304 and S306). In the case of contention-based RACH, a contention resolution procedure may be further performed.

The UE which performs the above procedures may perform PDCCH/PDSCH reception (S307) and Physical Uplink Shared Channel (PUSCH)/Physical Uplink Control Channel (PUCCH) transmission (S308) as a general uplink/downlink signal transmission procedure. In particular, the UE may receive Downlink Control Information (DCI) through the PDCCH. Here, the DCI may include control information such as resource allocation information for the UE. Different DCI formats are defined according to different usages of DCI.

Control information that the UE transmits to the eNB on the uplink or receives from the eNB on the downlink includes a downlink/uplink ACKnowledgment/Negative ACKnowledgment (ACK/NACK) signal, a Channel Quality Indicator (CQI), a Precoding Matrix Index (PMI), a Rank Indicator (RI), etc. In the 3GPP LTE system, the UE may transmit control information such as the aforementioned CQI/PMI/RI on a PUSCH and/or a PUCCH.

Figure 4:
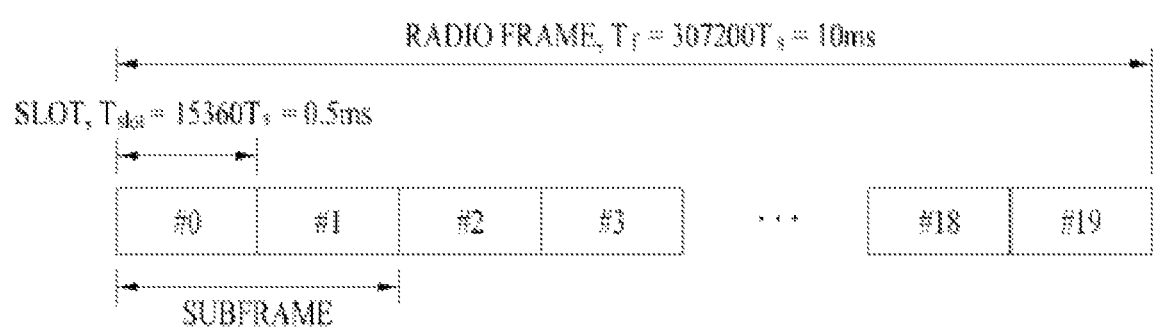
FIG. 4 is a diagram illustrating a structure of a radio frame used in the LTE system.

FIG. 4 is a diagram illustrating a structure of a radio frame used in the LTE system.

Referring to FIG. 4, a radio frame is 10 ms ($327200 \times T_s$) long and divided into 10 equal-sized subframes. Each subframe is 1 ms long and further divided into two slots. Each time slot is 0.5 ms ($15360 \times T_s$) long. Herein, $T_s$ represents a sampling time and $T_s = 1/(15 \text{ kHz} \times 2048) = 3.2552 \times 10^{-8}$ (about 33 ns). A slot includes a plurality of OFDM symbols in the time domain and a plurality of Resource Blocks (RBs) in the frequency domain. In the LTE system, one RB includes 12 subcarriers by 7 (or 6) OFDM symbols. A unit time in which data is transmitted is defined as Transmission Time Interval (TTI). The TTI may be defined as one or more subframes. The above-described radio frame structure is purely exemplary and thus the number of subframes in a radio frame, the number of slots in a subframe, or the number of OFDM symbols in a slot may vary.

Figure 5:
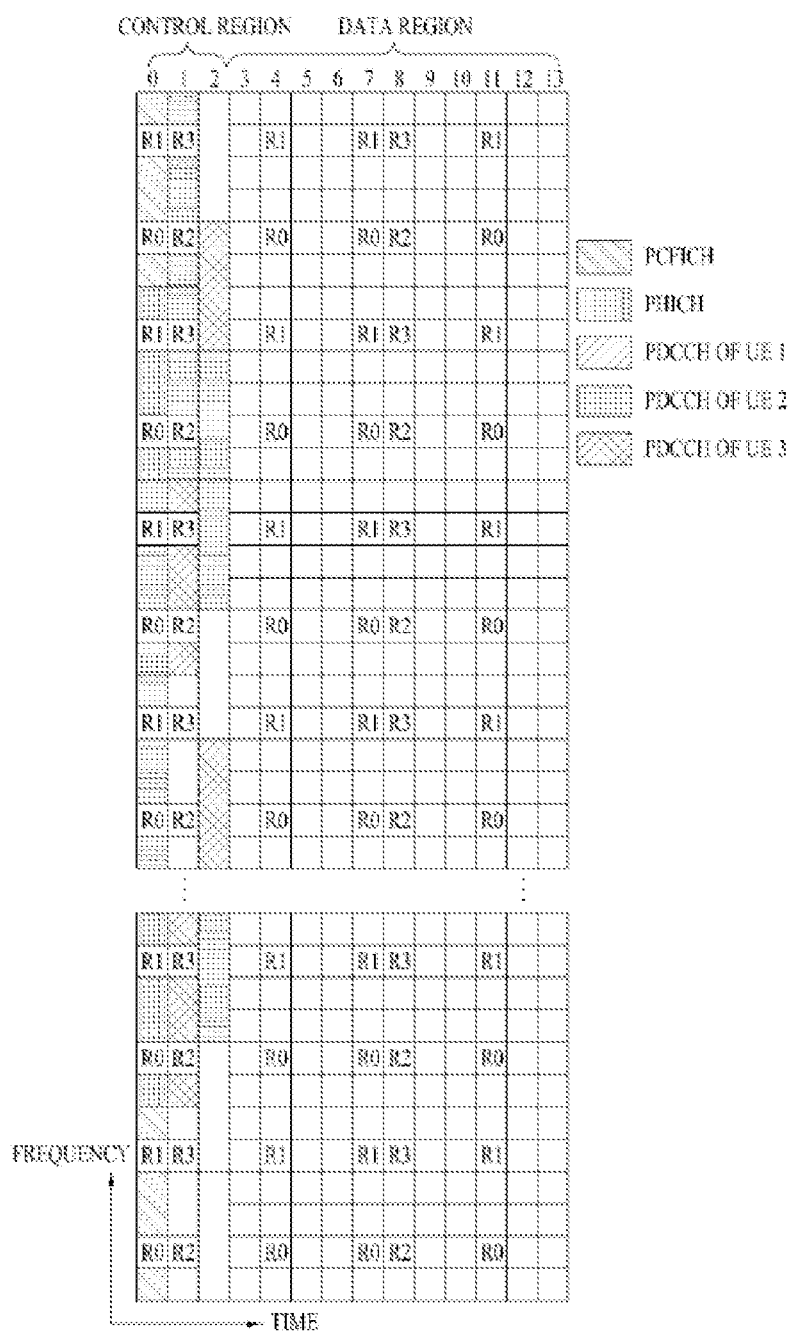
FIG. 5 is a diagram illustrating an exemplary control channel included in the control region of a subframe in a downlink radio frame.

FIG. 5 is a diagram illustrating an exemplary control channel included in the control region of a subframe in a downlink radio frame.

Referring to FIG. 5, a subframe includes 14 OFDM symbols. The first one to three OFDM symbols of a subframe are used for a control region and the other 13 to 11 OFDM symbols are used for a data region according to a subframe configuration. In the drawing, reference characters R1 to R4 denote RSs or pilot signals for antenna 0 to antenna 3. RSs are allocated in a predetermined pattern in a subframe irrespective of the control region and the data region. A control channel is allocated to non-RS resources in the control region and a traffic channel is also allocated to non-RS resources in the data region. Control channels allocated to the control region include a Physical Control Format Indicator Channel (PCFICH), a Physical Hybrid-ARQ Indicator Channel (PHICH), a Physical Downlink Control Channel (PDCCH), etc.

The PCFICH is a physical control format indicator channel carrying information about the number of OFDM symbols used for PDCCHs in each subframe. The PCFICH is located in the first OFDM symbol of a subframe and configured with priority over the PHICH and the PDCCH. The PCFICH is composed of 4 Resource Element Groups (REGs), each REG being distributed to the control region based on a cell Identity (ID). One REG includes 4 Resource Elements (REs). An RE is a minimum physical resource defined by one subcarrier by one OFDM symbol. The PCFICH indicates 1 to 3 or 2 to 4 according to a bandwidth. The PCFICH is modulated in Quadrature Phase Shift Keying (QPSK).

The PHICH is a physical Hybrid-Automatic Repeat and request (HARQ) indicator channel carrying an HARQ ACK/NACK for an uplink transmission. That is, the PHICH is a channel that delivers DL ACK/NACK information for UL HARQ. The PHICH includes one REG and is scrambled cell-specifically. An ACK/NACK is indicated in one bit and modulated in Binary Phase Shift Keying (BPSK). The modulated ACK/NACK is spread with a Spreading Factor (SF) of 2 or 4. A plurality of PHICHs mapped to the same resources form a PHICH group. The number of PHICHs multiplexed into a PHICH group is determined according to the number of spreading codes. A PHICH (group) is repeated three times to obtain a diversity gain in the frequency domain and/or the time domain.

The PDCCH is a physical downlink control channel allocated to the first n OFDM symbols of a subframe. Herein, n is 1 or a larger integer indicated by the PCFICH. The PDCCH is composed of one or more CCEs. The PDCCH carries resource allocation information about transport channels, PCH and DL-SCH, an uplink scheduling grant, and HARQ information to each UE or UE group. The PCH and the DL-SCH are transmitted on a PDSCH. Therefore, an eNB and a UE transmit and receive data usually on the PDSCH, except for specific control information or specific service data.

Information indicating a UE (one or more UEs) to receive PDSCH data and information indicating how the UEs are supposed to receive and decode the PDSCH data are delivered on a PDCCH. For example, on the assumption that the Cyclic Redundancy Check (CRC) of a specific PDCCH is masked by Radio Network Temporary Identity (RNTI) "A" and information about data transmitted in radio resources (e.g. at a frequency position) "B" based on transport format information (e.g. a transport block size, a modulation scheme, coding information, etc.) "C" is transmitted in a specific subframe, a UE within a cell monitors, that is, blind-decodes a PDCCH using its RNTI information in a search space. If one or more UEs have RNTI "A", these UEs receive the PDCCH and receive a PDSCH indicated by "B" and "C" based on information of the received PDCCH.

Figure 6:
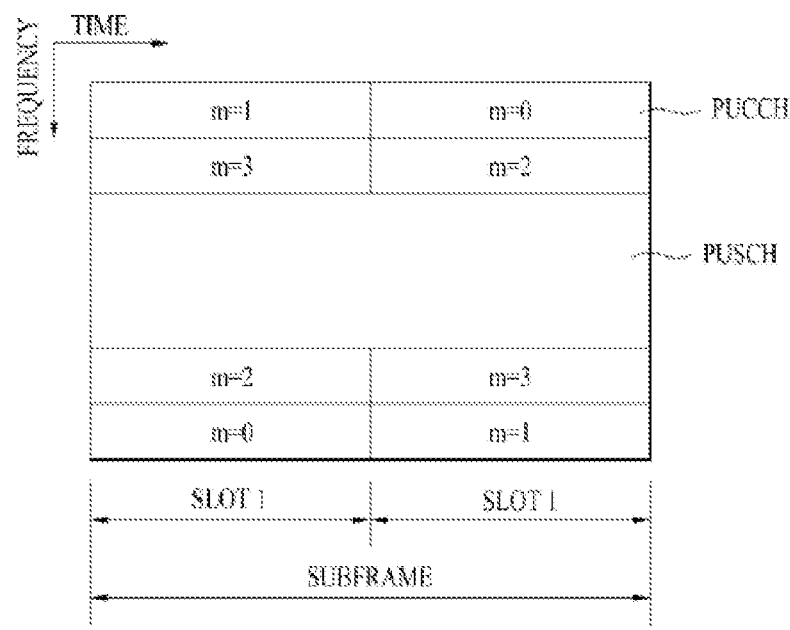
FIG. 6 is a diagram illustrating a structure of an uplink subframe in the LTE system.

FIG. 6 is a diagram illustrating a structure of an uplink subframe in the LTE system.

Referring to FIG. 6, an uplink subframe may be divided into a region to which a Physical Uplink Control Channel (PUCCH) for delivering control information is allocated and a region to which a Physical uplink Shared Channel (PUSCH) for delivering user data is allocated. The middle of the subframe is allocated to the PUSCH, while both sides of the data region in the frequency domain are allocated to the PUCCH. Control information transmitted on the PUCCH may include a Hybrid Automatic Repeat reQuest ACKnowledgement/Negative ACKnowledgement (HARQ ARCK/NACK), a Channel Quality Indicator (CQI) representing a downlink channel state, a Rank Indicator (RI) for Multiple Input Multiple Output (MIMO), a Scheduling Request (SR) requesting uplink resource allocation. A PUCCH for one UE may use one Resource Block (RB) that occupies different frequencies in each slot of a subframe. That is, the two RBs allocated to the PUCCH frequency-hop over the slot boundary of the subframe. Particularly, PUCCHs with m=0, m=1, and m=2 are allocated to a subframe in FIG. 6.

Now a description will be given of a Multiple Input Multiple Output (MIMO) system. MIMO can increase the transmission and reception efficiency of data by using a plurality of Transmission (Tx) antennas and a plurality of Reception (Rx) antennas. That is, with the use of multiple antennas at a transmitter or a receiver, MIMO can increase capacity and improve performance in a wireless communication system. The term "MIMO" is interchangeable with "multi-antenna".

The MIMO technology does not depend on a single antenna path to receive a whole message. Rather, it completes the message by combining data fragments received through a plurality of antennas. MIMO can increase data rate within a cell area of a predetermined size or extend system coverage at a given data rate. In addition, MIMO can find its use in a wide range including mobile terminals, relays, etc. MIMO can overcome a limited transmission capacity encountered with the conventional single-antenna technology in mobile communication.

Figure 7:
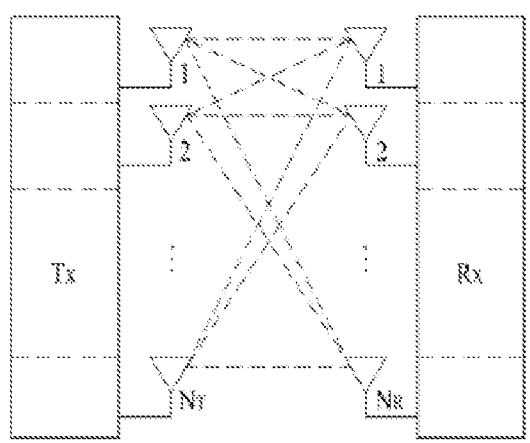
FIG. 7 is a diagram illustrating a configuration of a typical MIMO communication system.

FIG. 7 is a diagram illustrating a configuration of a typical MIMO communication system. Referring to FIG. 7, a transmitter has $N_T$ Tx antennas and a receiver has $N_R$ Rx antennas. The simultaneous use of a plurality of antennas at both the transmitter and the receiver increases a theoretical channel transmission capacity, compared to use of a plurality of antennas at only one of the transmitter and the receiver. The channel transmission capacity increases in proportion to the number of antennas. Therefore, transmission rate and frequency efficiency are increased. Given a maximum transmission rate $R_o$ that may be achieved with a single antenna, the transmission rate may be increased, in theory, to the product of $R_o$ and a transmission rate increase rate $R_i$ in the case of multiple antennas. $R_i$ is the smaller value between $N_T$ and $N_R$.

$$R_i = \min(N_T, N_R) \quad \text{[Equation 1]}$$

For instance, a MIMO communication system with four Tx antennas and four Rx antennas may achieve a four-fold increase in transmission rate theoretically, relative to a single-antenna system. Since the theoretical capacity increase of the MIMO system was verified in the middle 1990s, many techniques have been actively proposed to increase data rate in real implementation. Some of the techniques have already been reflected in various wireless communication standards for 3G mobile communications, future-generation Wireless Local Area Network (WLAN), etc.

Concerning the research trend of MIMO up to now, active studies are underway in many respects of MIMO, inclusive of studies of information theory related to calculation of multi-antenna communication capacity in diverse channel environments and multiple access environments, studies of measuring MIMO radio channels and MIMO modeling, studies of time-space signal processing techniques to increase transmission reliability and transmission rate, etc.

Communication in a MIMO system with $N_T$ Tx antennas and $N_R$ Rx antennas as illustrated in FIG. 7 will be described in detail through mathematical modeling. Regarding a transmission signal, up to $N_T$ pieces of information can be transmitted through the $N_T$ Tx antennas, as expressed as the following vector.

$$s = [s_1, s_2, \ldots, s_{N_T}]^T \quad \text{[Equation 2]}$$

A different transmission power may be applied to each piece of transmission information, $S_1, S_2, \ldots, S_{N_T}$. Let the transmission power levels of the transmission information be denoted by $P_1, P_2, \ldots, P_{N_T}$, respectively. Then the transmission power-controlled transmission information vector is given as Equation 3 below.

$$\hat{s}[\hat{s}_1, \hat{s}_2, \ldots, \hat{s}_{N_T}]^T = [P_1 s_1, P_2 s_2, \ldots, P_{N_T} s_{N_T}]^T \quad \text{[Equation 3]}$$

The transmission power-controlled transmission information vector $\hat{S}$ may be expressed as follows, using a diagonal matrix P of transmission power.

$$\hat{s} = \begin{bmatrix} P_1 & & & 0 \\ & P_2 & & \\ & & \ddots & \\ 0 & & & P_{N_T} \end{bmatrix} \begin{bmatrix} s_1 \\ s_2 \\ \vdots \\ s_{N_T} \end{bmatrix} = Ps \quad \text{[Equation 4]}$$

$N_T$ transmission signals $x_1, x_2, \ldots, x_{N_T}$ may be generated by multiplying the transmission power-controlled information vector $\hat{s}$ by a weight matrix W. The weight matrix W functions to appropriately distribute the transmission information to the Tx antennas according to transmission channel states, etc. These $N_T$ transmission signals $x_1, x_2, \ldots, x_{N_T}$ are represented as a vector x, which may be determined by [Equation 5]. Herein, $W_{ij}$ denotes a weight between a $j^{th}$ piece of information and an $i^{th}$ Tx antenna and W is referred to as a weight matrix or a precoding matrix.

$$x = \begin{bmatrix} x_1 \\ x_2 \\ \vdots \\ x_i \\ \vdots \\ x_{N_T} \end{bmatrix} = \begin{bmatrix} w_{11} & w_{12} & \cdots & w_{1N_T} \\ w_{21} & w_{22} & \cdots & w_{2N_T} \\ \vdots & & \ddots & \\ w_{i1} & w_{i2} & \cdots & w_{iN_T} \\ \vdots & & & \ddots \\ w_{N_T 1} & w_{N_T 2} & \cdots & w_{N_T N_T} \end{bmatrix} \begin{bmatrix} \hat{s}_1 \\ \hat{s}_2 \\ \vdots \\ \hat{s}_j \\ \vdots \\ \hat{s}_{N_T} \end{bmatrix} = W\hat{s} = WPs$$ [Equation 5]

In general, the rank of a channel matrix is the maximum number of different pieces of information that can be transmitted on a given channel, in its physical meaning. Therefore, the rank of a channel matrix is defined as the smaller between the number of independent rows and the number of independent columns in the channel matrix. The rank of the channel matrix is not larger than the number of rows or columns of the channel matrix. The rank of a channel matrix H, rank(H) satisfies the following constraint.

$\text{rank}(H) \leq \min(N_T, N_R)$ [Equation 6]

A different piece of information transmitted in MIMO is referred to as 'transmission stream' or shortly 'stream'. The 'stream' may also be called 'layer'. It is thus concluded that the number of transmission streams is not larger than the rank of channels, i.e. the maximum number of different pieces of transmittable information. Thus, the channel matrix H is determined by Equation 7 below.

# of streams $\leq \text{rank}(H) \leq \min(N_T, N_R)$ [Equation 7]

One or more streams may be mapped to a plurality of antennas in many ways. The stream-to-antenna mapping may be described as follows depending on MIMO schemes.

If one stream is transmitted through a plurality of antennas, this may be regarded as spatial diversity. When a plurality of streams are transmitted through a plurality of antennas, this may be spatial multiplexing. Needless to say, a hybrid scheme of spatial diversity and spatial multiplexing in combination may be contemplated.

Figure 8:
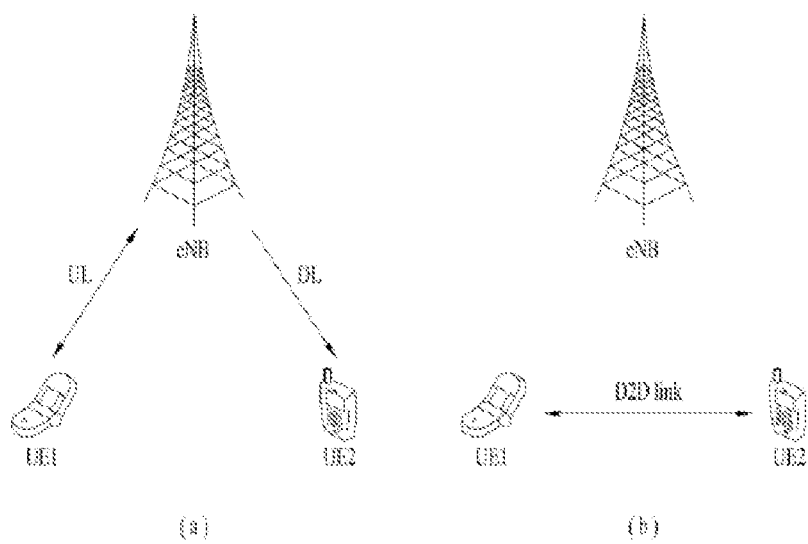
FIG. 8 is a diagram for conceptual explanation of D2D communication.

FIG. 8 is a diagram for conceptual explanation of D2D communication. FIG. 8(a) illustrates a typical eNB-centered communication scheme. A first UE UE1 may transmit data to an eNB on the uplink and the eNB may transmit the data from the first UE UE1 to a second UE UE2 on the downlink.

FIG. 8(b) illustrates a UE-to-UE communication scheme as an example of D2D communication. Data exchange between UEs may be performed without going through an eNB. A link established directly between devices may be referred to as a D2D link. The D2D communication reduces latency and requires less radio resources, compared to the typical eNB-centered communication scheme.

D2D communication is a scheme for supporting communication between devices (or UEs) without going through an eNB. However, D2D communication needs to reuse resources of a typical wireless communication system (e.g., 3GPP LTE/LTE-A) and, thus, should not cause interference or jamming in the typical wireless communication system. In the same vein, it is also important to minimize interference that affects D2D communication by a UE, an eNB, etc. that operate in the typical wireless communication system.

Based on the above description, the present invention proposes a coding scheme for reducing interference between a plurality of transmission UEs during repetitive transmission of the same information every resource unit using a plurality of resources in D2D communication.

Currently, a method of repeatedly transmitting the same information using a plurality of resources for D2D communication in the LTE system has been discussed because the method can enhance reliability of D2D communication in consideration of a position of a UE with lower power than an eNB.

Hereinafter, for convenience of description of the present invention, an entire time-frequency region in which D2D communication is performed is referred to as a resource pool and a minimum unit composed of time and frequency for transmission in the resource pool is defined as a resource element (RE). In addition, a unit as one group formed by collecting a plurality of REs is defined as a D2D resource subframe. The D2D resource subframe may be a small group in a current LTE subframe or may be one unit formed by collecting a plurality of LTE subframes.

The present invention may be applied to a case in which the same information is repeatedly transmitted through a plurality of D2D resource subframes in the resource pool. In each D2D resource subframe in which the repeatedly transmitted information is positioned, a reference signal (RS) and data may be representatively transmitted.

Figure 9:
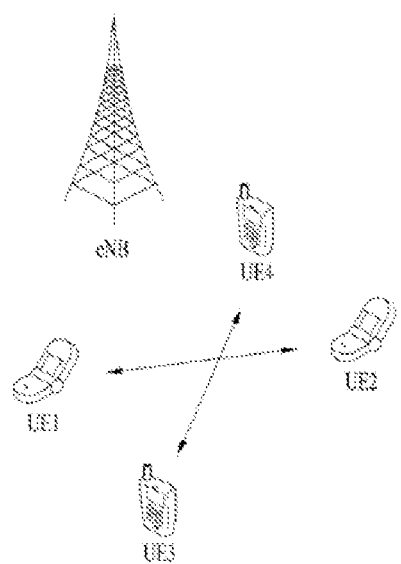
FIG. 9 is a reference diagram for explanation of a case in which D2D communication is performed in an environment in which a plurality of UEs is present according to the present invention.

FIG. 9 is a reference diagram for explanation of a case in which D2D communication is performed in an environment in which a plurality of UEs is present according to the present invention. When D2D communication is performed as illustrated in FIG. 9, two UEs may frequently perform transmission on each other through the same D2D resource subframe. In this case, reference signals (RSs) and data of the UEs may collide with each other, thereby degrading overall system performance.

Accordingly, the present invention proposes a method of applying codes orthogonal to repeated D2D resource subframes in order to reduce interference due to transmission UEs when information is repeatedly transmitted in a plurality of D2D resource subframes such that two or more D2D UEs use low power.

With regard to repeated D2D resource subframes, reference signals and data may be arranged to form a predetermined pattern in each D2D resource subframe. First, the number of repeated D2D resource subframes is N, a transmitted RS is $a_{i(n),k,l}$ and data is $d_{i(n),k,l}$. Here, i(n) is a number of $n^{th}$ repeated D2D resource subframes, k is a frequency number of a resource element (RE) in the $n^{th}$ repeated D2D resource subframes, and l is an OFDM symbol index of a resource element in the $n^{th}$ repeated D2D resource subframes. Basically, it is assumed that $a_{i(n),k,l}$ and $d_{i(n),k,l}$ and are the same information and are scrambled signals with respect to all n (i.e., 1~N).

From an RS point of view, one sequence needs to be selected for scrambling in a D2D resource subframe. Considering that D2D transmission may interfere with each other in the same D2D resource subframe, it may be necessary to different scrambling sequences every transmission UE for interference randomization. For example, on the assumption that three transmission UEs perform transmission in the same D2D resource subframe, a reception UE may simultaneously receive RSs of the three transmission UEs but only one transmission UE among these may transmit information for the reception UE. In this case, when the two remaining transmission UEs are close to each other and have the same scrambling sequence, interference may increase from an RS point of view. Accordingly, in order to overcome this problem, transmission UEs need to set a scrambling sequence to be randomly selected for interference randomization.

Accordingly, the present invention proposes that a scrambling sequence that is randomly selected in a first D2D resource subframe among repeated D2D resource subframes be used in the same way in different repeated D2D resource subframes when the same information is repeatedly transmitted in a plurality of D2D resource subframes to a specific transmission UE. Accordingly, the scrambled $a_{i(n),k,l}$ may apply orthogonal codes as shown in Equation 8 below.

$$D_{(nm)}^{N \times N} = e^{j\frac{2\pi(n-1)(m-1)}{N}}, \quad \text{[Equation 8]}$$
$$\text{for } n = 1, 2, \ldots, N, m = 1, 2, \ldots, N$$

In Equation 8 above, (nm) indicates an element of (n,m) in a matrix D. In Equation 8 above, an RS to which orthogonal codes are applied may be represented according to Equation 9 below.

$$\bar{a}_{i(n),k,l} = a_{i(n),k,l} \times D_{(nm)}^{N \times N} \quad \text{[Equation 9]}$$

In Equation 9 above, a code corresponding one column of the matrix D is applied to N repeated subframes. A transmission UE may transmit $\bar{a}_{i(n),k,l}$ to which the code is applied for an RS. In this case, m may be selected from 1~N and may be randomly selected every transmission UE or may be selected and indicated by a representative UE or eNB. Here, the representative UE may refer to a specific UE selected from a group including a plurality of UEs. In addition, a transmission UE may dynamically notify a reception UE of m through DCI format or may semi-statically notify the reception UE via RRC signaling. Furthermore, according to the present invention, although an example of an orthogonal code for N repeated subframes has been described in terms of Equation 9 above, the present invention may also be applied to a case in which another orthogonal code is used instead of $D_{(nm)}^{N \times N}$, needless to say.

Accordingly, according to the present invention, an RS to which Equation 9 above is applied may apply interference randomization to interference between transmission UEs, thereby reducing an interference effect. When D2D resource subframes in which interference channels are repeated are similar to each other, inference may be almost removed by an orthogonal code.

When the present invention is applied from a data point of view, scrambled $d_{i(n),k,l}$ may be represented according to Equation 10 below by applying the orthogonal code of Equation 8 above.

$$\bar{d}_{i(n),k,l} = d_{i(n),k,l} \times D_{(nm')}^{N \times N}$$

In this case, the present invention proposes that a scrambling sequence that is randomly selected in a first D2D resource subframe of D2D resource subframes that are repeatedly arranged in a specific UE should be used in the same way in different repeated D2D resource subframes.

That is, as seen from Equation 10 above, a code corresponding to one column of matrix D is applied to N repeated subframes. A transmission UE may transmit $\bar{d}_{i(n),k,l}$ to which the code is applied for an RS. In this case, m' may be selected from 1~N and may be randomly selected every transmission UE or may be selected and indicated by a representative UE or eNB. In addition, the transmission UE may dynamically notify a reception UE of m' through DCI format or may semi-statically notify the reception UE via RRC signaling.

Accordingly, when data to which Equation 10 above is applied is transmitted to a reception UE, the reception UE may receive a received signal represented according to Equation 11 below through one resource element (RE).

$$r_{i(n),k,l} = h_{i(n),k,l} \bar{d}_{i(n),k,l} + \sum_u ({}^u h_{i(n),k,l} {}^u \bar{d}_{i(n),k,l}) + n_{i(n),k,l} \quad \text{[Equation 11]}$$

In Equation 11, index u refers to an index of a UE that transmits interference. In this case, in order to remove $D_{(nm')}^{N \times N}$ of Equation 10 below from a received signal $r_{i(n),k,l}$, a reciprocal of $D_{(nm')}^{N \times N}$ according to Equation 12 below may be multiplied.

$$z_{i(n),k,l} = \frac{r_{i(n),k,l}}{D_{(nm')}^{N \times N}} \quad \text{[Equation 12]}$$

Then, signals $y_{i(n),k,l}$ obtained by descrambling N signals with the same index k,l among signals $z_{i(n),k,l}$ of Equation 12 above may be collected and represented to derive Equation 13 below. For convenience, index k,l is omitted and Equation 13 below is represented.

$$\begin{bmatrix} y_{i(1)} \\ y_{i(2)} \\ \vdots \\ y_{i(N)} \end{bmatrix} = \begin{bmatrix} h_{i(1)} \\ h_{i(2)} \\ \vdots \\ h_{i(N)} \end{bmatrix} d + \sum_u \left( \begin{bmatrix} {}^u h_{i(1)} \frac{D_{(1m')}^{N \times N}}{D_{(1m'_u)}^{N \times N}} \\ {}^u h_{i(2)} \frac{D_{(2m')}^{N \times N}}{D_{(2m'_u)}^{N \times N}} \\ \vdots \\ {}^u h_{i(N)} \frac{D_{(Nm')}^{N \times N}}{D_{(Nm'_u)}^{N \times N}} \end{bmatrix} {}^u d \right) + \begin{bmatrix} n'_{i(1)} \\ n'_{i(2)} \\ \vdots \\ n'_{i(N)} \end{bmatrix} \Leftrightarrow y = hd + \sum_u ({}^u h {}^u d) + n \quad \text{[Equation 13]}$$

In Equation 13 above, with regard to desired information d, the same scramble is applied to the same data and only $D_{(nm')}^{N \times N}$ of Equation 10 above is differently applied and, thus, the same information may remain in N resource elements REs and a representative value may be represented by d. ${}^u d$ may be data of different transmission UEs that perform transmission using the same D2D resource subframe with index u to cause interference and uses the same scrambling and, thus, the same phase is just changed during descrambling of a desired signal. In addition, a different code $D_{(n''m')}^{N \times N}$ from $D_{(nm)}^{N \times N}$ of Equation 10 above is applied and, thus, an interference channel may be represented according to Equation 13 below.

In Equation 13 below, when a Maximal-ratio Combining (MRC) scheme is used in $$y = hd + \sum_u ({}^u h^u d) + n,$$

Equation G may be obtained.

$$y = h^H hd + h^H \sum_u ({}^u H^u d) + h^H n \qquad \text{[Equation 14]}$$

In Equation 14 above, an interference part may be extracted to obtain Equation 15 below.

$$I = \begin{bmatrix} h_{i(1)} \\ h_{i(2)} \\ \vdots \\ h_{i(N)} \end{bmatrix}^H \sum_u \left( \begin{bmatrix} {}^u h_{i(1)} \dfrac{D^{N \times N}_{(1m')}}{D^{N \times N}_{(1m'_u)}} \\ {}^u h_{i(2)} \dfrac{D^{N \times N}_{(2m')}}{D^{N \times N}_{(2m'_u)}} \\ \vdots \\ {}^u h_{i(N)} \dfrac{D^{N \times N}_{(Nm')}}{D^{N \times N}_{(Nm'_u)}} \end{bmatrix} \right) d \qquad \text{[Equation 15]}$$

In Equation 14 above, when a desired channel and an interference channel are almost similar to each other between repeated D2D resource subframes, I may be approximately '0'. This is because $D_{(nm')}^{N \times N}$ and $D_{(n''m')}^{N \times N}$ are orthogonal to each other. Even if channels are not completely the same, when adjacent subframes are used, it may be expected that interference may be significantly reduced.

Figure 10:
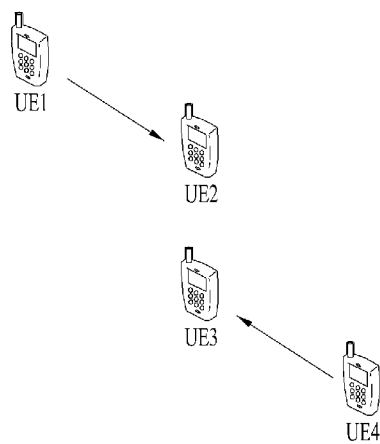
FIG. 10 is a reference diagram for explanation of the aforementioned effect obtained by applying the present invention.

FIG. 10 is a reference diagram for explanation of the aforementioned effect obtained by applying the present invention. Referring to FIG. 10, UE 1, UE 2, UE 3, and UE 4 may be D2D UEs that are synchronized with one another.

When the UE 1 transmits an RS or data to the UE 2, the UE 4 may intend to transmit an RS or data to the UE 3. In this case, the UE 4 is spaced far from the UE 1 and does not recognize that that UE 1 performs transmission and, thus, the UE4 may begin to perform transmission through a resource location being used by the UE 1. In this case, a transmitted signal of the UE 1 and a transmitted signal of the UE 4 may be considered as interference in terms of the UE 3 and the UE 2. Accordingly, in this case, when an orthogonal code is applied to repeated subframes using Equation 9 or 10 proposed according to the present invention, the UE 2 and the UE 3 may receive a signal with significantly reduced interference.

Although the case in which code $D_{(nm')}^{N \times N}$ other than scramble is separately applied has been described according to the present invention for convenience of description, code $D_{(nm')}^{N \times N}$ may be simultaneously applied through one scramble.

In addition, according to the present invention, an RS and data may be simultaneously applied but only one of these may be applied. When an RS and data are simultaneously applied, Equations 9 and 10 above may be simultaneously applied. In this case, in Equations 9 and 10 above, m and m' may use the same value and the same orthogonal sequence may be applied. In detail, transmission UEs may use $\bar{a}_{i(n),k,l}$ obtained by applying an orthogonal corresponding to Equation 9 above to a scrambling sequence $a_{i(n),k,l}$ as a base for an RS as a scrambling sequence for an RS. In addition, $\bar{d}_{i(n),k,l}$ obtained by applying an orthogonal code corresponding to Equation 10 above to a scrambling sequence $d_{i(n),k,l}$ as a base for data may be used as a scrambling sequence for data. In this case, orthogonal codes $D_{(nm)}^{N \times N}$ and $D_{(nm')}^{N \times N}$ that use an RS and data may use the same sequence (m=m'). In this case, a value m=m' may be randomly selected.

In more detail, data scrambling according to the present invention will now be described. Basically, for scrambled $d_{i(n),k,l}$, a scrambling sequence selected from a first D2D resource subframe among repeated D2D resource subframes may be used in the same way in different repeated D2D resource subframes. Referring to the related 3GPP standard, currently, data scrambling for uplink in the LTE is defined according to Table 1 below in 5.3.1 'Scrambling' of the 3GPP TS 36.211 document.

TABLE 1

For each codeword q, the block of bits $b^{(q)}(0),...,b^{(q)}(M_{bit}^{(q)}-1)$, where $M_{bit}^{(q)}$ is the number of bits transmitted in
codeword q on the physical uplink shared channel in one subframe, shall be scrambled with a UE-specific
scrambling sequence prior to modulation, resulting in a block of scrambled bits $\tilde{b}^{(q)}(0),...,\tilde{b}^{(q)}(M_{bit}^{(q)}-1)$
according
to the following psesudo code

```
Set i = 0
while i < M_bit^(q)
    if b^(q)(i) = x    // ACK/NACK or Rank Indication placeholder bits
        b̃^(q)(i) = 1
    else
        if  b^(q)(i) = y   //ACK/NACK or Rank Indication repetition placeholder bits
            b̃^(q)(i) = b̃^(q)(i-1)
        else           //Data or channel quality coded bits, Rank Indication coded bits or ACK/NACK coded bits
            b̃^(q)(i) = (b^(q)(i) + c^(q)(i))mod2
        end if
    end if
    i = i + 1
end while
``` where x and y are tags defined in 3GPP TS 36.212 [3] clause 5.2.2.6 and where the scrambling sequence $c^{(q)}(i)$ is given by clause 7.2. The scrambling sequence generator shall be initialised with $c_{init} = n_{RNTI} \cdot 2^{14} + q \cdot 2^{13} + \lfloor n_s/2 \rfloor \cdot 2^9 + N_{ID}^{cell}$ at the start of each subframe where $n_{RNTI}$ corresponds to the RNTI associated with the PUSCH transmission as described in clause 8 in 3GPP TS 36.213 [4].
Up to two codewords can be transmitted in one subframe; i.e., $q \in \{0,1\}$. In the case of single-codeword transmission, q = 0.

In Table 1 above, $b^{(q)}(i)$ is a coded bit of data and $c^{(q)}(i)$ is a scrambling sequence. $b^{(q)}(i)$ and $c^{(q)}(i)$ may be combined to constitute a scrambled coded bit $\tilde{b}^{(q)}(i)$. In addition, $d_{i(n),k,l}$ described according to the present invention may be considered as symbol data obtained by modulating a scrambled coded bit $\tilde{b}^{(q)}(i)$ and then performing layer mapping. In this case, a scrambling sequence $c^{(q)}(i)$ may be determined according to $c_{init}=n_{RNTI}\cdot 2^{14}+q\cdot 2^{13}+\lfloor n_s/2 \rfloor\cdot 2^9+N_{ID}^{cell}$ shown in Table 1 above.

In the present invention, a scrambling sequence selected from a first D2D resource subframe among repeated D2D resource subframes may be used in the same way in different repeated D2D resource subframes. Accordingly, when $c_{init}$ is generated based on a scrambling sequence generating method for PUSCH transmission in the current LTE system, one method may be used in each of the following two situations.

Situation A: When repeated subframes are continuously located and an index of a first subframe of repeated subframes is $$\left\lfloor \frac{n_{first}}{2} \right\rfloor, \left\lfloor \frac{n_s}{2} \right\rfloor$$

may be corrected to $$\left\lfloor \frac{n_{first}}{2} \right\rfloor$$

in $c_{init}$. For example, A-1) when repeated subframes are continuously located and a first subframe index $$\left\lfloor \frac{n_{first}}{2} \right\rfloor$$

satisfies $$\left(\left\lfloor \frac{n_{first}}{2} \right\rfloor \bmod N\right) = N_{offset}, \left\lfloor \frac{n_s}{2} \right\rfloor$$

may be corrected to $$\left\lfloor \frac{n_s - 2N_{offset}}{2N} \right\rfloor$$

in $c_{init}$ (the number of repeated D2D resource subframes is assumed to be N).

Situation B: When repeated subframes are not continuously located and have one group virtual subframe index $N_g$, $$\left\lfloor \frac{n_s}{2} \right\rfloor$$

may be corrected to $N_g$ in $C_{init}$.

According to the aforementioned method, $C_{init}$ may be generated according to Equation 16 below in each situation.

[Equation 16]

Situation A:

$$c_{init} = n_{RX} \cdot 2^\gamma + q \cdot 2^\beta + \left\lfloor \frac{n_{first}}{2} \right\rfloor \cdot 2^\alpha + N_{ID}^{Cluster}$$

(e.g., in A-1), $$c_{init} = n_{RX} \cdot 2^\gamma + q \cdot 2^\beta + \left\lfloor \frac{n_s - 2N_{offset}}{2N} \right\rfloor \cdot 2^\alpha + N_{ID}^{Cluster}$$

Situation B:

$$c_{init} = n_{RX} \cdot 2^\gamma + q \cdot 2^\beta + N_g \cdot 2^\alpha + N_{ID}^{Cluster}$$

In the aforementioned situation A or B of Equation 16 above, $N_{ID}^{Cluster}$ may refer to a group ID when a D2D cluster uses the group ID or refer to an ID of a transmission UE. However, in the present invention, according to a D2D situation, when it is difficult for a reception UE to know a group ID or an ID of a transmission UE, $N_{ID}^{Cluster}$ may be fixed to '0' and then used. That is, fixing of $N_{ID}^{Cluster}$ to '0' means that $N_{ID}^{Cluster}$ is removed from Equation 16 above.

$n_{RX}$ may refer to an ID of a reception UE or an ID of a transmission UE. Alternatively, this value may be set to be fixed to '0' and then used. Fixing of $n_{RX}$ to '0' means that a factor including $n_{RX}$ is removed from Equation 16 above.

In Equation 16 above, q refers to an index of a codeword. However, in the present invention, when only 1 layer transmission is used in D2D communication, q may be set to be fixed to '0'.

In Equation 16 above, α may be determined as a value obtained by rounding up $\log_2 N_{cluster\ id}$ ($N_{cluster\ id}$ is a total number of $N_{ID}^{Cluster}$). When $N_{ID}^{Cluster}$ is set to be fixed to '0', a value of $N_{cluster\ id}$ may be '1'. In addition, β may be determined as a value +α obtained by rounding up $\log_2 N_s$. $N_s$ is defined as a total number of $$\left\lfloor \frac{n_{first}}{2} \right\rfloor$$

in Equation 15 related to the situation A, is defined as a total number of $$\left\lfloor \frac{n_s - 2N_{offset}}{2N} \right\rfloor$$

in an equation related to the situation A-1, and is defined as a total number of $N_g$ an equation related to the situation B. In addition, γ may be defined as β+1 in a system using a maximum 2 codeword like the current LTE system. In a scenario that uses only 1 layer for reliability in D2D communication, only 1 codeword is used and, thus, γ may be used as the same value as β. That is, α, β, and γ may be determined such that $c_{init}$ does not overlap between UEs that perform transmission. $\tilde{d}_{i(n),k,l}$ obtained by applying an orthogonal code to a symbol $d_{i(n),k,l}$, which is formed via scrambling with $c_{init}$, modulation, and layer mapping, according to Equation 10 above may be generated.

Similarly, a scrambling sequence for data will be further described. As described above, for the scrambling sequence, an ID of a transmission UE, an ID of a reception UE, a cluster ID, and a subframe number may be used as an initial ID for the scrambling sequence. However, in D2D communication, depending on a situation, it may be difficult for a reception UE to know an ID of a transmission UE or a cluster ID or an ID of the reception UE may not be required because the transmission UE is broadcasting the ID. In this case, burden imposed to a reception UE may be excessively increased when both an ID of a transmission UE and a cluster ID are monitored and detected.

Accordingly, when an initial ID of a scrambling sequence is acquired, if all of an ID of a transmission UE, an ID of a reception UE, and a cluster ID are omitted, the number of candidates of the initial ID is excessively small and, thus, the same initial ID may be inevitably used repeatedly.

Accordingly, in the present invention, when an initial ID for a scrambling sequence is calculated in terms of data, m' may be added in Equation 10 that represents a cyclic shift value of an RS and an orthogonal code value according to the present invention.

Currently, it may be possible that D2D communication is defied with reference to an uplink configuration of the current LTE and, thus, in this case, an RS in the D2D communication may be defined to be similar to a configuration of the current PUSCH DMRS. Accordingly, first, in the PUSCH DMRS of the current LTE, a cyclic shift value may be defined as shown in Table 2 below with reference to paragraph '5.5.2.1.1' of TS 36.211 as the LTE standard document.

TABLE 2

The cyclic shift $\alpha_\lambda$ in a slot $n_s$ is given as $\alpha_\lambda = 2\pi n_{cs,\lambda}/12$ with
$n_{cs,\lambda} = (n_{DMRS}^{(1)} + n_{DMRS,\lambda}^{(2)} + n_{PN}(n_s)) \bmod 12$
where the values of $n_{DMRS}^{(1)}$ is given by Table 5.5.2.1.1-2 according to the parameter cyclicShift provided by higher
layers, $n_{DMRS,\lambda}^{(2)}$ is given by the cyclic shift for DMRS field in most recent
uplink-related DCI 3GPP TS 36.212[3] for
the transport block associated with the corresponding PUSCH transmission
where the value of $n_{DMRS,\lambda}^{(2)}$ is given in Table 5.5.2.1.1-1

When a cyclic shift value and a value of an orthogonal code in Table 2 above are added to an initial ID for a scrambling sequence of data, a value of the initial ID may become diversified and, thus, this may help interference randomization in terms of data. In more general, it may be interpreted that a data scrambling sequence is determined according to a cyclic shift value. The cyclic shift value and the orthogonal code value may be added to an initial ID as follows.

Cyclic shift: $n_{cs,\lambda} \cdot 2^\delta$

Orthogonal code: in $m' \cdot 2^\chi$

Here, $\delta$ and $\chi$ of $n_{cs,\lambda} \cdot 2^\delta$ and $m' \cdot 2^\chi$ and may be used not to have overlapping values of different factors during calculation of an initial ID.

According to the present invention, an operation of a reception UE will now be described. First, the reception UE may know an orthogonal code $D_{(nm)}^{N \times N}$ of an RS via blind detection or signaling by a transmission UE. Alternatively, the reception UE may know the orthogonal code $D_{(nm)}^{N \times N}$ using a predetermined value. That is, the reception UE may determine m through this procedure. Likewise, after estimation of an RS, the reception UE may know an orthogonal code that is also applied to data based on m=m'. The reception UE may use a cyclic shift value $n_{cs,\lambda}$ and an orthogonal code m' which are obtained during estimation of an RS in order to obtain an initial ID of a scrambling sequence applied to data.

Hereinafter, the present invention will be described in more general.

In D2D communication, a DMRS may be generated according to a common ID in order to detect a D2D signal irrespective of a network to which each UE belongs, but when a DMRS sequence is common (i.e., when each D2D UE randomly transmits a D2D signal), if a plurality of UEs use the same resource region, performance may be degraded due to collision between DMRSs. In order to prevent this, cyclic shift of the same sequence may be considered. In addition, in order to enhance demodulation performance of D2D communication, scrambling of data may be considered and data scrambling may also be differently set in a D2D pair to randomize interference.

Accordingly, the present invention proposes that a scrambling sequence used in a data region and a Cyclic Shift Value (CS value) should be associated with each other and determined.

In this case, an orthogonal code may be considered in one form of a scrambling sequence of a data region and, in this case, may perform a function of repetition as well as a function of scrambling. For example, a transmission UE may determine a cyclic shift value of a DMRS and determine an index (e.g., m') of an orthogonal code to be used in scrambling of a data region using the corresponding cyclic shift value.

For example, when a cyclic shift value is selected from 0 to 11 and a spreading factor of an orthogonal code is 4 (a repetition factor may be interpreted to be 4, for example, CS value % 4 may be used as an index of an orthogonal code to be used in scrambling of a data region may be used. In addition, the orthogonal code may spread a modulated symbol. In this regard, scrambling at a bit level prior to modulation may be considered for interference randomization between repetition resource units and, as described above, bit level scrambling initialization determined according to a DMRS cyclic shift value, an orthogonal code index, and so on may be performed.

The same sequence as a typical scrambling sequence may be considered in another form of a scrambling sequence of a data region and, in this regard, an initialization parameter of a scrambling sequence may be determined according to a DMRS cyclic shift value. In more detail, when a initialization seed for a scrambling sequence of a data region is pre-defined or set, a value obtained by adding DMRS cyclic shift value*X to the corresponding seed may be used as a final scrambling sequence initialization parameter (here, X prevents a final initial parameter and another initial seed from overlapping.). Here, repetition may be considered in order to enhanced decoding performance of a D2D signal and, in this regard, a slot index (or a subframe index) or the like may be added to scrambling sequence initialization during repetition so as to additionally randomize interference in a D2D pair with the same repeated resources.

In the present invention, a cyclic shift value may be implicitly associated in another form of a scrambling sequence of a data region.

According to the present invention, a specific parameter Y may be used to determine a scrambling sequence of a data region and simultaneously used to determine a cyclic shift value of a DMRS. That is, the specific parameter Y is used to determine both the scrambling sequence of the data region and the cyclic shift value of the DMRS and, thus, it may be deemed that the scrambling sequence and the cyclic shift value of the DMRS are implicitly associated with each other.

In this case, a representative example of the parameter Y may be an ID of a D2D transmission UE or an ID of synchronized UE. Alternatively, the parameter Y may be an ID of a D2D reception UE. An ID of a reception UE may be referred to as a SA ID as a scheduling assignment ID in the current LTE.

First, an example of an example of a method of determining a scrambling sequence of a data region will be described. In order to determine a scrambling sequence of a data region, a set (hereinafter, set A for convenience of description) including at least parameter or all parameters from {D2D Tx UE ID, SS ID, data subframe number, SA subframe number, and number of data subframes}.

That is, in a set {D2D Tx UE ID, SS ID, data subframe number, SA subframe number, and number of data subframes}, the D2D Tx UE ID may be an ID of a UE that performs transmission in D2D, the SS ID may be a sequence ID of D2DSS or a synchronization signal ID included in PD2DSCH, and the data subframe number may be a number of a subframe in which data is transmitted in a D2D communication resource. In addition, the SA subframe number may refer to a number of a subframe in which a transmission UE performs scheduling assignment. When scheduling assignment is performed in a plurality of subframes, the SA subframe may refer to one of the subframes. The number of data subframes may refer to the number of subframes used to transmit data.

In addition, a resource pattern type (RPT) used in data may also be considered for a scrambling sequence of a data region. Currently, D2D has been discussed for a method of indicating a type of a resource pattern indicating a detailed position of data in scheduling assignment. In this case, when a plurality of RPTs partially overlap every RPT, interference randomization may be required in the overlapping portions. For this reason, a scrambling sequence of a data region may be formed as a function. In addition, D2D reception UE ID may also be used for the scrambling sequence of the data region.

When a scrambling sequence of a data region for D2D communication according to the present invention is defined based on a configuration of a scrambling sequence of a PUSCH used in uplink on the LTE system, Equation 17 below may be defined in order to determine a initial value $c_{init}$ of the scrambling sequence of the data region.

$$c_{init} = TXID \cdot 2^{\delta_1} + SFNM \cdot 2^{\delta_2} + SSID \cdot 2^{\delta_3}$$ [Equation 17]

In Equation 17 above, SSID is a SS ID of a set A, SFNM is a data subframe number in the set A, and TXID is a D2D Tx UE ID in the set A. When at least one of TXID, SFNM, and SSID has a different value, $\delta_i$ may be set such that $c_{init}$ has a different value. Accordingly, the set A may be determined using at least one of Methods A-1 to A-3-11 below.

Method A-1: Some of parameters of {D2D Tx UE ID, SS ID, data subframe number, SA subframe number, number of data subframes, and RPT} may be set for a Tx UE by an eNB.

Method A-2: Some of parameters of {D2D Tx UE ID, SS ID, data subframe number, SA subframe number, number of data subframes, RPT} may be preconfigured values.

Method A-3: An initial value for scrambling of a PUSCH on the LTE may be determined according to $c_{init} = n_{RNTI} \cdot 2^{14} + q \cdot 2^{13} + \lfloor n_s/2 \rfloor \cdot 2^9 + N_{ID}^{cell}$, $n_{RNTI}$ may be indicated via high layer signaling, q is a codeword number, $\lfloor n_s/2 \rfloor$ is a subframe number of data, and $N_{ID}^{cell}$ is a cell ID. In Method A-3, $c_{init} = n_{RNTI} \cdot 2^{14} + q \cdot 2^{13} + \lfloor n_s/2 \rfloor \cdot 2^9 + N_{ID}^{cell}$ is applied to Methods A-3-1 to A-3-11 to determine an initial value for scrambling of D2D data.

Method A-3-1: A value of $n_{RNTI}$ may be fixed to '0' in $c_{init} = n_{RNTI} \cdot 2^{14} + q \cdot 2^{13} + \lfloor n_s/2 \rfloor \cdot 2^9 + N_{ID}^{cell}$ Method A-3-2: A value of $N_{ID}^{cell}$ may be fixed to '510' or '511' in $c_{init} = n_{RNTI} \cdot 2^{14} + q \cdot 2^{13} + \lfloor n_s/2 \rfloor \cdot 2^9 + N_{ID}^{cell}$.

Method A-3-3: A value of $N_{ID}^{cell}$ may be set to an ID (i.e., SA ID) of a reception UE in $c_{init} = n_{RNTI} \cdot 2^{14} + q \cdot 2^{13} + \lfloor n_s/2 \rfloor \cdot 2^9 + N_{ID}^{cell}$.

Method A-3-4: A value of $N_{ID}^{cell}$ may be set to one selected from two values '510' and '511' in $c_{init} = n_{RNTI} \cdot 2^{14} + q \cdot 2^{13} + \lfloor n_s/2 \rfloor \cdot 2^9 + N_{ID}^{cell}$.

Method A-3-5: A value of $n_{RNTI}$ may be set to an ID (i.e., SA ID) of a reception UE in $c_{init} = n_{RNTI} \cdot 2^{14} + q \cdot 2^{13} + \lfloor n_s/2 \rfloor \cdot 2^9 + N_{ID}^{cell}$.

Method A-3-6: A value of $n_{RNTI}$ may be fixed to '510' or '511' in $c_{init} = n_{RNTI} \cdot 2^{14} + q \cdot 2^{13} + \lfloor n_s/2 \rfloor \cdot 2^9 + N_{ID}^{cell}$.

Method A-3-7: A value of $n_{RNTI}$ may be set to an ID of a transmission UE in $c_{init} = n_{RNTI} \cdot 2^{14} + q \cdot 2^{13} + \lfloor n_s/2 \rfloor \cdot 2^9 + N_{ID}^{cell}$.

Method A-3-8: A value of $n_{RNTI}$ may be set to a combination of an ID (i.e., SA ID) of a reception UE and an ID of a transmission UE in $c_{init} = n_{RNTI} \cdot 2^{14} + q \cdot 2^{13} + \lfloor n_s/2 \rfloor \cdot 2^9 + N_{ID}^{cell}$.

Method A-3-9: A value of $N_{ID}^{cell}$ may be set to use one selected from two values '510' and '511' in $c_{init} = n_{RNTI} \cdot 2^{14} + q \cdot 2^{13} + \lfloor n_s/2 \rfloor \cdot 2^9 + N_{ID}^{cell}$. In this case, a value of $N_{ID}^{cell}$ may be divided into two groups according to an ID (i.e., SA ID) of a reception UE, one group may be selected —as 510, and the other group may be selected as 511. This is because a scrambling sequence that is not used as a scrambling sequence of an existing LTE PUSCH needs to be formed to prevent continuous collision with the existing PUSCH.

Method A-3-10: A value of $N_{ID}^{cell}$ may be set to use one selected from two values '510' and '511' in $c_{init} = n_{RNTI} \cdot 2^{14} + q \cdot 2^{13} + \lfloor n_s/2 \rfloor \cdot 2^9 + N_{ID}^{cell}$. In this case, when an SA ID is configured with $N_{SA\ ID}$ bits, 1 bit of $N_{SA\ ID}$ bits may be used to select 510 and 511 of $N_{ID}^{cell}$. In addition, all or some of the remaining (i.e., $N_{SA\ ID}-1$) bits may be used to determine a value of $n_{RNTI}$ of $c_{init} = n_{RNTI} \cdot 2^{14} + q \cdot 2^{13} + \lfloor n_s/2 \rfloor \cdot 2^9 + N_{ID}^{cell}$.

Method A-3-11: A value of $n_s$ may be replaced with a relative number but not an actual slot number in $c_{init} = n_{RNTI} \cdot 2^{14} + q \cdot 2^{13} + \lfloor n_s/2 \rfloor \cdot 2^9 + N_{ID}^{cell}$. For example, when it is determined that data is transmitted using $N_S$ consecutive subframes or $N_S$ non-consecutive subframes according to scheduling assignment, $2N_S$ slots may be present in $N_S$ subframes. The $2N_S$ slots may be numbered with 0 to $(2N_S-1)$ and 0 to $(2N_S-1)$ may be used instead of $n_s$ of $c_{init} = n_{RNTI} \cdot 2^{14} + q \cdot 2^{13} + \lfloor n_s/2 \rfloor \cdot 2^9 + N_{ID}^{cell}$.

Hereinafter, a method of determining a cyclic shift value of a DMRS for D2D communication according to the present invention will be described. In order to determine a cyclic shift value of a DMRS, a set (hereinafter, the set B) including at least some of parameters of {D2D Tx UE ID, SS ID, data subframe number, SA subframe number, and number of data subframes} may be used. In the set B, the D2D Tx UE ID may be an ID of a UE that performs transmission in D2D, the SS ID may be a sequence ID of D2DSS or a synchronization signal ID included in a PD2DSCH, and the data subframe number may be a number of a subframe in which data is transmitted in a D2D communication resource. In addition, the SA subframe number may be a number of a subframe in which a Tx UE performs scheduling assignment. When scheduling assignment is performed in a plurality of subframes, the SA subframe may be one of these. The number of data subframes may be the number of subframes used to transmit data.

In addition, an RPT used in data may also be considered for a cyclic shift value of a DMRS. According to the current D2D communication, the possibility that a type of a resource pattern indicating a detailed position of data is indicated via scheduling assignment may be high. In this case, when a plurality of RPTs partially overlap every RPT, interference randomization may be required in the overlapping portions. For this reason, a cyclic shift value of a DMRS may be formed as a function of an RPT. In addition, a D2D reception UE ID may also be considered for a cyclic shift value of a DMRS.

When a method of determining a cyclic shift value of a DMRS for D2D communication according to the present invention is defined based on a method of applying a cyclic shift value in a configuration of a DMRS used in uplink on the current LTE system, Equation 18 below may be defined in order to determine $n_{cs}$ of a cyclic shift value $\alpha_\lambda = 2\pi n_{cs,\lambda}/12$ ($\lambda$ is a layer number but a single layer is assumed in D2D and, thus, $\lambda$ will be omitted from indexes hereinafter.).

$$n_{cs} = (TXID + SFNM + SSID) \bmod 12 \quad \text{[Equation 18]}$$

In Equation 18 above, SSID is a SS ID of a set B, SFNM is a data subframe number in the set B, and TXID is a D2D Tx UE ID in the set B. In addition, at least one of Methods B-1 to B-3-9 below may be applied in order to determine a cyclic shift value of a DMRS for D2D communication according to the present invention.

Method B-1: An eNB may set a cyclic shift value for a Tx UE.

Method B-2: A cyclic shift value may be preconfigured.

Method B-3: A cyclic shift value of a PUSCH DMRS of the current LTE may be defined according to Equation 19 below.

$$\alpha_\lambda = 2\pi n_{cs,\lambda}/12 \quad \text{[Equation 19]}$$

A value of $n_{cs,\lambda}$ in Equation 19 above may be determined according to Equation 20 blow.

$$n_{cs,\lambda} = (n_{DMRS}^{(1)} + n_{DMRS,\lambda}^{(2)} + n_{PN}(n_s)) \bmod 12 \quad \text{[Equation 20]}$$

In Equation 20 above, a value of $n_{DMRS}^{(1)}$ may be indicated via high layer signaling, a value of $n_{DMRS,\lambda}^{(2)}$ may be received from DCI and a value of $n_{PN}(n_s)$ may be determined according to Equation 21 below.

$$n_{PN}(n_s) = \sum_{i=0}^{7} c(8 N_{Symb}^{UL} \cdot n_s + i) \cdot 2^i \quad \text{[Equation 21]}$$

In Equation 21 above, a value of $c_{init}$ for $c(i)$ may be determined according to Equation 22 below.

$$c_{init} = \left\lfloor \frac{N_{ID}^{cell}}{30} \right\rfloor \cdot 2^5 + ((N_{ID}^{cell} + \Delta_{ss}) \bmod 30) \quad \text{[Equation 22]}$$

In Equation 22 above, a value of $N_{ID}^{cell}$ may be a cell ID and $\Delta_{ss}$ may be a value indicated by a high layer. Accordingly, in Method B-3 according to the present invention, at least one of Methods B-3-1 to B-3-9 below may be applied to Equations 19 to 22 above to determine a cyclic shift value of a D2D DMRS.

Method B-3-1: A value of $n_{DMRS}^{(1)}$ or $n_{DMRS}^{(2)}$ may be fixed to '0' in Equation 20 above.

Method B-3-2: In Equation 22 above, $N_{ID}^{cell}$ may be set to a value obtained by adding '510' or '511' to an ID (SA ID) of a reception UE. This is because a cyclic shift hopping pattern that is not used in a DMRS of a PUSCH on the legacy LTE system needs to be formed to prevent continuous collision with the DMRS of an existing PUSCH.

Method B-3-3: In Equation 22 above, a value of $\Delta_{ss}$ may be fixed to '0'.

Method B-3-4: In Equation 22 above, a value of $N_{ID}^{cell}$ may be set to a value obtained by adding '510' or '511' to a combination of an ID of a transmission UE and an ID (i.e., SA ID) of a reception UE.

Method B-3-5: In Equation 19 above, a value of $n_{cs,\lambda}$ may be divided into $N_{group4CS}$ groups according to an ID (i.e., SA ID) of a reception UE and may be set to one value for each respective group. In this case, when 12 values of $n_{cs,\lambda}$ are not used, the used values of $n_{cs,\lambda}$ may be set so as to have the same interval between adjacent values. For example, when four values of $n_{cs,\lambda}$ are used, values of 0, 3, 6, and 9 of 12 values of $n_{cs,\lambda}$ may be used so as to have an equivalent interval, 3 between adjacent values.

Method B-3-6: This method is another method of setting values of $n_{cs,\lambda}$ of Method B-3-5 with the same interval between adjacent values. Equation 20 above may be set according to $n_{cs,\lambda} = a_{cs} \times \{(n_{DMRS}^{(1)} + n_{DMRS,\lambda}^{(2)} + n_{PN}(n_s)) \bmod b_{cs}\}$. Here, $$a_{CS} = \left\lfloor \frac{12}{N_{group4CS}} \right\rfloor$$

and $b_{CS} = N_{group4CS}$ may be satisfied. $N_{group4CS}$ may be the number of the used values of $n_{cs,\lambda}$. When four values of $n_{cs,\lambda}$ are used, values of 0, 3, 6, and 9 of 12 values of $n_{cs,\lambda}$ may be used so as to have an equivalent interval, 3 between adjacent values. Alternatively, for management without hopping, Equation 20 above may be replaced with $n_{cs,\lambda} = a_{CS} \times \{$(reception UE ID)$\bmod b_{CS}\}$.

Method B-3-7: In Equation 21 above, a cyclic shift value may be hopped according to a value of $n_s$. In this case, hopping may be reset every 10 ms. In Equation 21 above, a frame number may be inserted to hop the cyclic shift value by as much as a length of a D2D data region but not 10 ms. For example, when a data region is 40 ms, a hopping pattern may be initialized when a data region is started and a cyclic shift value may be hopped by 40 ms until the data region is finished.

Method B-3-8: In Equation 21 above, a value of $n_s$ may be replaced with a relative number but not an actual slot number. For example, when it is determined that data is transmitted using $N_S$ consecutive subframes or $N_S$ non-consecutive subframes according to scheduling assignment, $2N_S$ slots may be present in $N_S$ subframes. The $2N_S$ slots may be numbered with 0 to $(2N_S-1)$ and 0 to $(2N_S-1)$ may be used instead of $n_s$ of Equation 21 above.

Method B-3-9: In Equation 20 above, $n_{DMRS}^{(1)} + n_{DMRS,\lambda}^{(2)} + n_{PN}(n_s)$ may be set as a reception UE ID (i.e., SA ID).

Accordingly, as an embodiment for determining a cyclic shift value of a DMRS for D2D communication according to the present invention, the cyclic shift value of the DMRS of a data region may be generated using a D2D Tx UE ID.

In addition, as another embodiment for determining a cyclic shift value of a DMRS for D2D communication according to the present invention, the cyclic shift value of the DMRS of a data region may be generated using a D2D Tx UE ID and may be hopped using a data subframe number or a data slot number. The hopping pattern may be initialized whenever a period of a data region is started (e.g., a start point of 40 ms when a data region has a period of 40 ms). In order to initialize hopping every period of the data region, a hopping portion needs to be re-configured every current slot number. In other words, a frame number needs to also be considered during reconfiguration of the hopping pattern.

In addition, as another embodiment for determining a cyclic shift value of a DMRS for D2D communication according to the present invention, the cyclic shift value of the DMRS of a data region may be generated using a D2D Tx UE ID and a subframe number and a subframe number may be generated using a fixed value.

Hereinafter, a method of determining an orthogonal cover code (OCC) value of a DMRS according to the present invention will be described. Basically, the method may be based on a method of applying an OCC value in a configuration of a DMRS used in uplink on the current LTE. In this case, a partial set (hereinafter, the set C) including at least one of parameters of {D2D Tx UE ID, SS ID, data subframe number, SA subframe number, and number of data subframes} may be used in order to determine an OCC value $[w^{(\lambda)}(0) \, w^{(\lambda)}(1)]$ ($\lambda$ is a layer number but a single layer is assumed in D2D and, thus, $\lambda$ will be omitted from indexes hereinafter.) of a DMRS. In the set C, D2D Tx UE ID may be an ID of a UE that performs transmission in D2D, SS ID may be a sequence ID of D2DSS or a synchronization signal ID included in a PD2DSCH, and a data subframe number may be a number of a subframe in which data is transmitted in a D2D communication resource. In addition, the SA subframe number may be a number of a subframe in which a Tx UE performs scheduling assignment. When scheduling assignment is performed in a plurality of subframes, the SA subframe may refer to one of the subframes. The number of data subframes may refer to the number of subframes used to transmit data.

In addition, an RPT used in data may also be used for an OCC value of a DMRS. Currently, D2D has been discussed for a method of indicating a type of a resource pattern indicating a detailed position of data in scheduling assignment. In this case, when a plurality of RPTs partially overlap every RPT, interference randomization may be required in the overlapping portions. For this reason, an OCC value of a DMRS may be determined using an RPT. In addition, the D2D reception UE ID may also be considered for an OCC value of a DMRS.

A detailed embodiment for determining an OCC value according to the present invention will be described with reference to Equation 22 below.

$$[w(0)w(1)]=[1(-1)^{OCC}] \quad \text{[Equation 22]}$$

In Equation 22 above, a value of a parameter OCC may be determined according to OCC=(TXID+SFNM+SSID) mod 2.

In Equation 22 above, SSID may be an SS ID in a set C, SFNM may be a data subframe number in the set C, and TXID may be a D2D Tx UE ID in the set C. An OCC value of a DMRS may be determined by applying at least one of Methods C-1 to C-6 to be described below.

Method C-1: An OCC value may be set for a Tx UE by an eNB.

Method C-2: An OCC value may be preconfigured. For example, the OCC value may always be set according to [w(0)w(1)]=[1 1].

Method C-3: An OCC value may be differently preconfigured every UE. For example, an OCC value may be preconfigured and used according to [w(0) w(1)]=[1 1] for some UEs and may be preconfigured and used according to [w(0) w(1)]=[1 -1] for the other UEs.

Method C-4: An OCC value may be one selected and used from [w(0) w(1)]=[1 1] or [w(0) w(1)]=[1 -1]. In this case, an ID (i.e., SA ID) of a reception UE may be divided into two groups and may be set to one value for each respective group.

Method C-5: An OCC value may be one selected from [w(0) w(1)]=[1 1] or [w(0) w(1)]=[1 -1] and used and may be randomly selected by a transmission UE.

Method C-6: In the case of $[w(0) w(1)]=[1 \, -1^{\alpha}]$, an OCC value may be determined according to one of $\alpha$=CS mod 2 or $$\alpha = CS \bmod 2 \text{ or } \alpha = \frac{CS}{2} \bmod 2.$$

Here, CS may be a cyclic shift value of a DMRS. For example, when a cyclic shift value uses only a value of 0, 3, 6, and 9, $\alpha$=CS mod 2 may be applied and, when a cyclic shift value uses only a value of 0, 2, 4, 6, 8, and 10, $$\alpha = \frac{CS}{2} \bmod 2$$

may be applied.

Accordingly, as an embodiment for determining an OCC value of a DMRS according to the present invention, the OCC value of the DMRS of a data region may be generated using a D2D Tx UE ID.

In addition, as another embodiment for determining an OCC value of a DMRS according to the present invention, the OCC value of the DMRS of a data region may be generated using a D2D Tx UE ID and may be hopped using a data subframe number or a data slot number. The hopping pattern may be initialized whenever a period of a data region is started (e.g., a start point of 40 ms when a data region has a period of 40 ms).

In addition, as another embodiment for determining an OCC value of a DMRS according to the present invention, the OCC value of the DRMS of a data region may be generated using a subframe number of a D2D Tx UE ID and a subframe number may be generated using a fixed value.

According to the present invention, a cyclic shift value and OCC value of a DMRS may be collectively determined. The cyclic shift value and the OCC value may be collectively determined from a specific set among sets (e.g., (CS, OCC): {(1,3), (2,5), (7,1), . . . }) set with a predetermined value. The set may be preconfigured or set via RRC signaling. As a parameter for determination of a cyclic shift value and OCC value of a DMRS in the configured set, a set (hereinafter, the set D) including at least one of parameters of {D2D Tx UE ID, SS ID, data subframe number, SA subframe number, and number of data subframes} may be used. In the set D, D2D Tx UE ID may be an ID of a UE that performs transmission in D2D, SS ID may be a sequence ID of D2DSS or a synchronization signal ID included in a PD2DSCH, and a data subframe number may be a number of a subframe in which data is transmitted in a D2D communication resource. In addition, the SA subframe number may be a number of a subframe in which Tx UE performs scheduling assignment. When scheduling assignment is performed in a plurality of subframes, the SA subframe may be one subframe among theses. The number of data subframes may be the number of subframes used to transmit data.

In the present invention, when the cyclic shift value and OCC value of a DMRS are simultaneously selected in a specific set, the cyclic shift value and the OCC value may be hopped using a data subframe number or a data slot number. The hopping pattern may be initialized whenever a period of a data region is started (e.g., a start point of 40 ms when a data region has a period of 40 ms). In order to initialize hopping every period of the data region, a hopping portion needs to be corrected every current slot number. In other words, a frame number needs to also be considered during reconfiguration of the hopping pattern.

A method of determining a base sequence of a DMRS according to the present invention will be described. In uplink of the current LTE, a root value of a zadoff-chu sequence may be changed using group hopping and sequence hopping to generate the base sequence of the DMRS. In this case, group hopping and sequence hopping values may be determined according to a slot number and an ID of a serving cell. In D2D, in order to determine the base sequence of the DMRS of a data region, as a parameter for determining the group hopping or sequence hopping value, a set (hereinafter, the set D) including at least one of parameters of {D2D Tx UE ID, SS ID, data slot number, SA subframe number, and number of data subframes} may be used. In the set D, D2D Tx UE ID may be an ID of a UE that performs transmission in D2D, SS ID may be a sequence ID of D2DSS or a synchronization signal ID included in a PD2DSCH, and the data slot number may be a number of a slot in which data is transmitted in a D2D communication resource. In addition, the SA subframe number may be a number of a subframe in which a Tx UE performs scheduling assignment. When scheduling assignment is performed in a plurality of subframes, the SA subframe may be one subframe among theses. The number of data subframes may be the number of subframes used to transmit data.

In an RPT used in data may also be considered for a base sequence of a DMRS. In the current D2D communication, whether to indicate a type of a resource pattern indicating a detailed position of a data during scheduling assignment has been discussed. In this case, when a plurality of RPTs partially overlap every RPT, interference randomization may be required in the overlapping portions. For this reason, a base sequence of a DMRS may be generated according to an RPT. In addition, D2D reception UE ID may also be used for the base sequence of the DMRS.

Accordingly, in order to determine the base sequence of the DMRS according to the present invention based on the set D, at least one of Methods D-1 to D-3-13 may be applied.

Method D-1: Group hopping and sequence hopping used to generate a base sequence of a DMRS of a data region may be initialized whenever a period of a data region is started (e.g., a start point of 40 ms when a data region has a period of 40 ms).

Method D-2: A value of a base sequence of a DMRS may be preconfigured.

Method D-3: A zadoff-chu sequence for a base sequence value of a PUSCH DMRS on the legacy LTE may be determined according to Equation 23 below.

$$x_q(m) = e^{-j\frac{\pi qm(m+1)}{N_{ZC}^{RS}}}, 0 \leq m \leq N_{ZC}^{RS} - 1 \quad \text{[Equation 23]}$$

In Equation 23 above, a value of q as a root value may be determined according to Equation 24 below.

$$q = \lfloor \bar{q} + \frac{1}{2} \rfloor + v \cdot (-1)^{\lfloor 2\bar{q} \rfloor}$$

$$\bar{q} = N_{ZC}^{RS} \cdot (u+1)/31 \quad \text{[Equation 24]}$$

In Equation 24 above, a value of u may be determined according to Equation 25 below.

$$u = (f_{gh}(n_s) + f_{ss}) \bmod 30 \quad \text{[Equation 25]}$$

In Equation 25 above, a value of $f_{gh}(n_s)$ may be determined according to Equation 26 below.

$$f_{gh}(n_s) = \begin{cases} 0 & \text{if group hopping is disabled} \\ \left(\sum_{i=0}^{7} c(8n_s + i) \cdot 2^i\right) \bmod 30 & \text{if group hopping is enabled} \end{cases} \quad \text{[Equation 26]}$$

In Equation 26 above, a value of $c_{init}$ for c(i) may be determined according to Equation 27 below.

$$c_{init} = \left\lfloor \frac{n_{ID}^{RS}}{30} \right\rfloor \quad \text{[Equation 27]}$$

In Equation 27 above, a value of $n_{ID}^{RS}$ may be determined according to a cell ID or via high layer signaling. In Equation 25 above, a value of $f_{ss}$ may be determined according to Equation 28 in the case of a PUSCH.

$$f_{ss}^{PUSCH} = (N_{ID}^{cell} + \Delta_{ss}) \bmod 30 \quad \text{[Equation 28]}$$

In Equation 28 below, $N_{ID}^{cell}$ may be a cell ID value and $\Delta_{ss}$ may be a value received by a high layer. In Equation 24 above, a value of v may be determined according to Equation 29 below.

$$v = \begin{cases} c(n_s) & \text{if group hopping is disabled and} \\ & \text{sequence hopping is enabled} \\ 0 & \text{otherwise} \end{cases} \quad \text{[Equation 29]}$$

In Equation 29 above a value of $c_{int}$ for c(i) may be determined according to Equation 30 below.

$$c_{init} = \left\lfloor \frac{n_{ID}^{RS}}{30} \right\rfloor \cdot 2^5 + f_{ss}^{PUSCH} \quad \text{[Equation 30]}$$

In Equation 30 above, a value of $n_{ID}^{RS}$ may be determined according to a cell ID or via high layer signaling and $f_{ss}^{PUSCH}$ may be determined according to Equation 28 above. Accordingly, according to Method D-3, Equations 23 to 30 above may be applied to Methods D-3-1 to D-3-13 below to determine a base sequence value of a D2D DMRS.

Method D-3-1: A value of $n_{ID}^{RS}$ may be fixed to '510' or '511' in Equation 27 or 30 above.

Method D-3-2: A value of $n_{ID}^{RS}$ in Equation 27 or 30 may be set to a value obtained by adding '510' or '511' to an ID (i.e., SA ID) of a reception UE. This is because a sequence hopping pattern that is not used in a DMRS of a PUSCH on the legacy LTE may be generated to prevent continuous collision with a DMRS of the existing PUSCH.

Method D-3-3: In Equation 27 or 30 above, a value of $n_{ID}^{RS}$ may be set to an ID (i.e., SA ID) of a reception UE.

Method D-3-4: In Equation 27 or 30 above, a value of $n_{ID}^{RS}$ may be set to a combination of an ID (i.e., SA ID) of a reception UE and an ID of a transmission UE.

Method D-3-5: In Equation 27 or 30 above, a value of $n_{ID}^{RS}$ may be set to one of two values '510' and '511'. In this case, the value of $N_{ID}^{cell}$ may be divided into two groups according to an ID (i.e., SA ID) of a reception UE, one group may be selected as 510, and the other group may be selected as 511.

Method D-3-6: In Equation 28 above, a value of $N_{ID}^{cell}$ may be fixed to '510' or '511'.

Method D-3-7: In Equation 28 above, a value of $N_{ID}^{cell}$ may be set to a value obtained by adding '510' or '511' to an ID (i.e., SA ID) of a reception UE. This is because a sequence hopping pattern that is not used in a DMRS of a PUSCH on the legacy LTE needs to be generated to prevent continuous collision with a DMRS of the existing PUSCH.

Method D-3-8: In Equation 28 above, a value of $N_{ID}^{cell}$ may be set to an ID (i.e., SA ID) of a reception UE.

Method D-3-9: In Equation 28 above, a value of $N_{ID}^{cell}$ may be set to a combination of an ID (i.e., SA ID) of a reception UE and an ID of a transmission UE.

Method D-3-10: In Equation 28 above, a value of $N_{ID}^{cell}$ may be set to one selected from two values '510' and '511'. In this case, the value may be divided into two groups according to an ID (i.e., SA ID) of a reception UE, one group may be selected as 510 and the other group may be selected as 511.

Method D-3-11: In Equation 26 or 29 above, a base sequence value may be hopped according to a value of $n_s$. In this case, hopping may be reset every 10 ms. Accordingly, in Equation 26 or 29 above, a frame number may be additionally applied to hop the base sequence value by as much as the length of a D2D data region but not 10 ms. For example, when a data region is 40 ms, a hopping pattern may be initialized when a data region is started and a base sequence value may be hopped by 40 ms until the data region is finished.

Method D-3-12: In Equation 28 above, a value of $\Delta_{ss}$ may be fixed to '0' and used.

Method D-3-13: In Equation 26 above, a value of $n_s$ may be replaced with a relative number but not an actual slot number. For example, when it is determined that data is transmitted using $N_S$ consecutive subframes or $N_S$ non-consecutive subframes according to scheduling assignment, $2N_S$ slots may be present in $N_S$ subframes. The $2N_S$ slots may be numbered with 0 to $(2N_S-1)$ and 0 to $(2N_S-1)$ may be used instead of $n_s$ of Equation 26 above.

Accordingly, in order to determine a base sequence of a DMRS according to the present invention, i) group hopping or sequence hopping may be performed using a D2D Tx UE ID and a slot index. Alternatively, in order to determine a base sequence of a DMRS according to the present invention, ii) group hopping or sequence hopping may be performed using a D2D Tx UE ID and a fixed value as a slot index or iii) group hopping or sequence hopping may be performed using a D2D Tx UE ID. Here, i) may be a most generally considered case and, in this case, the base sequence may be changed every slot. According to ii) and iii), a base sequence is generated without being affected by a slot index, but ii) and iii) are different in terms of whether an offset value is present or not.

In addition, in the present invention, a plurality of bits used to configure a reception UE ID (i.e., SA ID) may be separated and used to transmit a signal for D2D communication. That is, at least one of a scrambling sequence of data, a base sequence of a DMRS, cyclic shift, and OCC may be generated based on at least some (i.e., some or all) of the bits used to configure the reception UE ID.

For example, the reception UE ID (i.e., SA ID) may be divided into a plurality of bits and may be denoted by a scrambling sequence of data, a base sequence of a DMRS, CS, and OCC. In detail, in order to generate the scrambling sequence of data and the base sequence used in a PUSCH on the LTE, the reception UE ID (i.e., SA ID) may be used instead of $n_{ID}^{RS}$ or $N_{ID}^{cell}$. In this case, only some bits of the reception UE ID (i.e., SA ID) may be used to determine $n_{ID}^{RS}$ or $N_{ID}^{cell}$. For example, when one of two values 510 and 511 is used for $n_{ID}^{RS}$ or $N_{ID}^{cell}$, the used value may be determined using only one bit of the reception UE ID (i.e., SA ID).

In addition, the number of available cyclic shifts and OCC values is also limited and, thus, some bits of the reception UE ID (i.e., SA ID) may be used to determine the cyclic shift and the other bits may be used to determine the OCC.

For convenience of description, the case obtained by applying this feature to the aforementioned example, will now be described. The cyclic shift may also be determined using some of the other bits except for the some bits of the reception UE ID (i.e., SA ID), which are used for the scrambling sequence of data and the base sequence. In addition, the OCC may also be determined using some of the other bits except for some bits of the reception UE ID (i.e., SA ID), which are used for the scrambling sequence of data, the base sequence, and the cyclic shift. For example, when the reception UE ID (i.e., SA ID) is configured with $$\underbrace{b_1 b_2 \ldots}_{a} \underbrace{b_n b_{n+1} \ldots}_{b} \underbrace{b_m b_{m+1} \ldots}_{c}$$

and $b_i$ has a value of '0' or '1', some bits of a part a of the SA ID may be used to determine a value of $n_{ID}^{RS}$ or $N_{ID}^{cell}$ of the scrambling sequence of data and the base sequence, some bits of a part b may be used to determine the OCC of a DMRS, and some bits of a part c may be used to determine the cyclic shift of the DMRS.

The present invention proposes a method of dividing a reception UE ID (i.e., SA ID) into a plurality of bits and generating a D2D signal. In detail, the reception UE ID (i.e., SA ID) may be divided into a plurality of bit parts and the respective bits may be determined for the base sequence, the cyclic shift, OCC, and so on based on the bit parts.

For example, the respective bits may indicate the base sequence, the cyclic shift, and the OCC. Accordingly, it is assumed that the reception UE UD is configured with $$\underbrace{b_1 b_2 \ldots}_{a} \underbrace{b_n b_{n+1} \ldots}_{b} \underbrace{b_m b_{m+1} \ldots}_{c}$$

and $b_i$ has a value of '0' or '1'. In addition, positions of a, b, and c may be exchanged. In this case, some bits of a part a may be used to define a sequence-group number u in Equation 25 of a base sequence of a DMRS of data (e.g., u=(a part)mod 30). In addition, some or all of the other parts b and c may indicate i) values of CS and OCC, respectively or indicate ii) a combination of CS and OCC.

In the preset invention, it may be difficult to apply a, b, and c of a bit unit to a method of dividing a reception UE ID (i.e., SA ID) into a plurality of bits and generating a D2D signal because a base sequence is actually calculated using modulo 30. Accordingly, when the base sequence, the cyclic shift, and the OCC of the DMRS of data are generated, the method may be corrected. When the base sequence is generated, Equation 25 above may be changed to u=(SA ID)mod 30 and used. In addition, a value of $$\left\lfloor \frac{SA\_ID}{30} \right\rfloor$$

may indicate a combination of the CS and the OCC.

That is, for convenience of description, the present invention has been described in terms of the method of dividing one SA ID into a plurality of bits and applying the bits to all of a scrambling sequence of data a base sequence of a DMRS, cyclic shift, and an OCC, but the scrambling sequence of data or the base sequence of a DMRS, which is not easily calculated in bit units, may be generated based on all bits constituting the SA ID and the cyclic shift and the OCC that are easily calculated in bit units may be generated based on some bits constituting the SA ID.

According to the present invention, a D2D transmission UE may determine a DMRS cyclic shift value and initialize a scrambling sequence of a data region based on the DMRS cyclic shift value or select an orthogonal code, and a D2D reception UE may detect a cyclic shift of a DMRS via monitoring (e.g., blind decoding) and so on and then estimate a data scrambling sequence and/or an orthogonal code index based on the corresponding cyclic shift value.

Although the present invention has been described in terms of a structure in which data is repeated in a unit of a D2D resource subframe, the present invention may also be applied to a structure in which data is repeated in a unit of a resource element. Assuming that the number of repeated resource elements (REs) is N, transmitted data is d(i+j−1) (j∈{1,2, . . . , N}). The data may be a data symbol obtained by applying scramble and then performing modulation and layer mapping. According to j, the data symbol may apply an orthogonal symbol according to Equation 31 below.

$$\bar{d}(i+j-1)=d(i+j-1)\times D_{(jm')}^{N\times N} \quad \text{[Equation 31]}$$

Accordingly, $\bar{d}(i+j-1)$ with $c_{init}=n_{RNTI}\cdot 2^{14}+q\cdot 2^{13}\lfloor n_s/2 \rfloor\cdot 2^9+N_{ID}^{cell}$ applied thereto may be transmitted through a transmission UE. A reception UE may recognize m' as an orthogonal code value used in $c_{init}=n_{RNTI}\cdot 2^{14}+q\cdot 2^{13}\lfloor n_s/2 \rfloor\cdot 2^9+N_{ID}^{cell}$ via blind detection.

Although the present invention has been described in terms of a single antenna, the present invention can be applied to a multi-antenna in the same way.

Whether a method of applying an orthogonal code to an RS or data according to the present invention is used may be determined via RRC signaling. For example, it may be appropriate to use the present invention to the case of a slow fading channel because the channel is similar in a long subframe period but the present invention may not be used in the case of a fast fading channel due to low gain.

Figure 11:
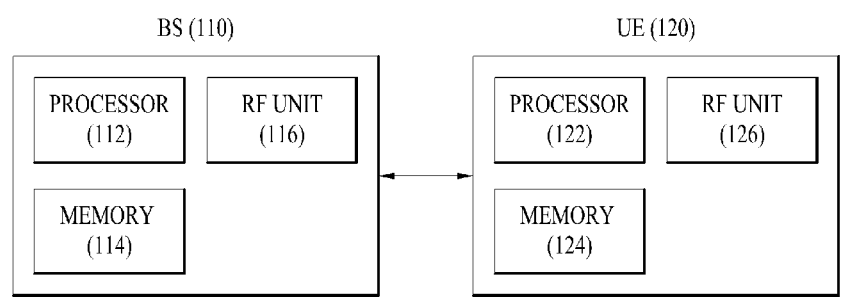
FIG. 11 is a block diagram illustrating a base station (BS) and a UE to which an embodiment of the present invention is applicable.

FIG. 11 is a block diagram illustrating a base station (BS) and a UE to which an embodiment of the present invention is applicable.

When a wireless communication system includes a relay, communication in a backhaul link may be performed between a BS and the relay and communication in an access link may be performed between the relay and a UE. Accordingly, the BS or UE illustrated in the drawing may be replaced with a relay as necessary.

Referring to FIG. 11, the wireless communication system may include a BS 110 and a UE 120. The BS 110 may include a processor 112, a memory 114, and a radio frequency (RF) unit 116. The processor 112 may be configured to embody the procedures and/or methods proposed according to the present invention. The memory 114 may be connected to the processor 112 and store various information items related to an operation of the processor 112. The RF unit 116 may be connected to the processor 112 and may transmit and/or receive a radio signal. The UE 120 may include a processor 122, a memory 124, and an RF unit 126. The processor 122 may be configured to embody the procedures and/or methods proposed according to the present invention. The memory 124 may be connected to the processor 122 and store various information items related to an operation of the processor 122. The RF unit 126 may be connected to the processor 122 and may transmit and/or receive a radio signal. The BS 110 and/or the UE 120 may have a single antenna or a multi-antenna.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a specific operation described as being performed by the BS may be performed by an upper node of the BS. Namely, it is apparent that, in a network comprised of a plurality of network nodes including a BS, various operations performed for communication with a UE may be performed by the BS, or network nodes other than the BS. The term 'BS' may be replaced with a fixed station, a Node B, an eNode B (eNB), an access point, etc.

The embodiments of the present invention may be achieved by various means, for example, hardware, firmware, software, or a combination thereof. In a hardware configuration, the methods according to exemplary embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, an embodiment of the present invention may be implemented in the form of a module, a procedure, a function, etc. Software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention is applicable to various wireless communication systems other than a 3rd generation partnership project (3GPP) long term evolution (LTE) system although the embodiments of the present invention have been described in terms of an example in which a method and apparatus for transmitting a signal for device-to-device (D2D) communication in a wireless communication system is applied to the 3GPP LTE system.

The invention claimed is:

1. A method of transmitting a device-to-device (D2D) data signal by a first user equipment (UE) in a wireless communication system, the method comprising:
   receiving a destination identity (ID) for D2D communication;
   transmitting, to a second UE, the D2D data signal through an uplink subframe; and
   transmitting, to the second UE, a DeModulation Reference Signal (DM-RS) related to the D2D data signal,
   wherein a scrambling sequence for the D2D data signal, a value of a cyclic shift of the DM-RS, and a value of an orthogonal cover code (OCC) of the DM-RS are determined based on respective partial bits constituting the destination ID, and wherein the respective partial bits are not all bits constituting the destination ID.

2. A first user equipment (UE) for transmitting a device-to-device (D2D) data signal in a wireless communication system, the first UE comprising:
   a transmitter and a receiver; and
   a processor, coupled to the transmitter and receiver, that:
   receives a destination identity (ID) for D2D communication,
   controls the transmitter to transmit, to a second UE, the D2D data signal through an uplink subframe, and
   controls the transmitter to transmit, to the second UE, a DeModulation Reference Signal (DM-RS) related to the D2D data signal,
   wherein a scrambling sequence for the D2D data signal, a value of a cyclic shift of the DM-RS, and a value of an orthogonal cover code (OCC) of the DM-RS are determined based on respective partial bits constituting the destination ID, and wherein the respective partial bits are not all bits constituting the destination ID.

3. The first UE according to claim 2, wherein the OCC is selected from [w(0) w(1)]=[1 1] or [w(0) w(1)]=[1 −1] based on the destination ID.

4. The method according to claim 1, further comprising:
   receiving subframe information with the destination ID for transmission of the D2D data signal; and
   wherein the D2D data signal is transmitted through the uplink subframe based on the subframe information.

5. The method according to claim 1, wherein the OCC is selected from [w(0) w(1)]=[1 1] or [w(0) w(1)]=[1 −1] based on the destination ID.

6. The first UE according to claim 2, wherein the processor is further configured to:
   receive subframe information with the destination ID for transmission of the D2D data signal;
   wherein the D2D data signal is transmitted through the uplink subframe based on the subframe information.

* * * * *